(12) United States Patent
Sieckmann et al.

(10) Patent No.: US 12,374,131 B2
(45) Date of Patent: Jul. 29, 2025

(54) OPTIMIZATION OF WORKFLOWS FOR MICROSCOPES

(71) Applicant: LEICA MICROSYSTEMS CMS GMBH, Wetzlar (DE)

(72) Inventors: Frank Sieckmann, Eppingen (DE); Constantin Kappel, Schriesheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 1012 days.

(21) Appl. No.: 17/285,477

(22) PCT Filed: Sep. 25, 2019

(86) PCT No.: PCT/EP2019/075850
§ 371 (c)(1),
(2) Date: Apr. 15, 2021

(87) PCT Pub. No.: WO2020/078679
PCT Pub. Date: Apr. 23, 2020

(65) Prior Publication Data
US 2021/0342636 A1    Nov. 4, 2021

(30) Foreign Application Priority Data

Oct. 18, 2018   (DE) .................... 10 2018 217 901.8

(51) Int. Cl.
*G06V 20/69*    (2022.01)
*G02B 21/36*    (2006.01)
(Continued)

(52) U.S. Cl.
CPC ......... *G06V 20/698* (2022.01); *G02B 21/365* (2013.01); *G06F 18/214* (2023.01);
(Continued)

(58) Field of Classification Search
CPC .. G06V 20/698; G02B 21/365; G06F 18/214; G06F 18/2431; G06F 18/285; G06N 20/00; G05B 17/02
See application file for complete search history.

(56) References Cited

U.S. PATENT DOCUMENTS 6,246,785 B1   6/2001 Molnar et al.
9,424,459 B1*  8/2016 Lange ................. G06V 20/693
(Continued)

FOREIGN PATENT DOCUMENTS

CN   101900737 A   12/2010
CN   102411715 A    4/2012
(Continued)

OTHER PUBLICATIONS

Louis-Emile Robitaille et al: "Learning to Become an Expert: Deep Networks Applied to Super-Resolution Microscopy", arxiv.org, Cornell University Library, 201 Olin Library Cornell University Ithaca, NY 14853, Mar. 28, 2018 (Mar. 28, 2018), XP080860152, pp. 1-6.

(Continued)

*Primary Examiner* — John T Repsher, III
(74) *Attorney, Agent, or Firm* — LEYDIG, VOIT & MAYER, LTD.

(57) ABSTRACT

A method for optimizing a workflow of at least one microscope or microscope system includes a step a) of implementing a workflow by one or more components of at least one microscope and/or microscope system, wherein the workflow comprises a capture of first data. In a step b), a trained model is determined for the workflow, at least in part based on the captured first data.

21 Claims, 13 Drawing Sheets

(51) Int. Cl.
*G05B 17/02* (2006.01)
*G06F 18/20* (2023.01)
*G06F 18/214* (2023.01)
*G06F 18/2431* (2023.01)
*G06N 20/00* (2019.01)

(52) U.S. Cl.
CPC ........ *G06F 18/2431* (2023.01); *G06F 18/285* (2023.01); *G06N 20/00* (2019.01)

(56) References Cited

U.S. PATENT DOCUMENTS

| | | |
|---|---|---|
| 2006/0204121 A1 | 9/2006 | Bryll |
| 2010/0183217 A1 | 7/2010 | Seung et al. |
| 2016/0171682 A1 | 6/2016 | Abedini et al. |
| 2016/0259963 A1 | 9/2016 | Cohen et al. |
| 2017/0032285 A1 | 2/2017 | Sharma et al. |
| 2017/0200260 A1 | 7/2017 | Bhaskar et al. |
| 2018/0018590 A1 | 1/2018 | Szeto et al. |
| 2018/0031817 A1 | 2/2018 | Barral |
| 2018/0096191 A1 | 4/2018 | Wan et al. |
| 2018/0137338 A1 | 5/2018 | Kraus et al. |
| 2020/0097727 A1* | 3/2020 | Stumpe ................ G02B 21/361 |
| 2020/0326526 A1* | 10/2020 | Yeh ...................... G02B 21/365 |
| 2020/0409134 A1* | 12/2020 | Yao ...................... G01N 33/574 |

FOREIGN PATENT DOCUMENTS

| | | |
|---|---|---|
| CN | 105849274 A | 8/2016 |
| CN | 106462549 A | 2/2017 |
| CN | 107533649 A | 1/2018 |
| CN | 108475350 A | 8/2018 |
| DE | 102014102080 A1 | 8/2015 |
| JP | 2005242803 A | 9/2005 |
| JP | 2007133859 A | 5/2007 |
| WO | WO 2014/040184 A1 | 3/2014 |
| WO | WO 2017201540 A1 | 11/2017 |
| WO | WO 2018071958 A1 | 4/2018 |

OTHER PUBLICATIONS

Audrey Durand et al: "A machine learning approach for online automated optimization of super-resolution optical microscopy", Nature Communications, vol. 9, Nr. 1, Dec. 1, 2018 (Dec. 1, 2018), XP055645800, DOI: 10. I038/s4I467-018-O7668-y, pp. 1-10, Nature Portfolio, UK.

Yair Rivenson et al: "Toward a Thinking Microscope: Deep Learning in Optical Microscopy and Image Reconstruction", arxiv.org, Cornell University Library, 201 Olin Library Cornell University Ithaca, NY 14853, May 23, 2018 (May 23, 2018), XP081139811, DOI: 10.1364/OPN.29.7.000034 pp. 2-5.

Robitaille, Louis-Émile et al. "Learning to Become an Expert: Deep Networks Applied to Super-Resolution Microscopy," ArXiv, US, Mar. 28, 2018, pp. 1-7.

Rivenson, Yair and Aydogan Ozcan, "Toward a Thinking Microscope: Deep Learning in Optical Microscopy and Image Reconstruction," ArXiv, US, May 23, 2018, pp. 1-11.

* cited by examiner

OPTIMIZATION OF WORKFLOWS FOR MICROSCOPES

CROSS-REFERENCE TO PRIOR APPLICATIONS

This application is a U.S. National Phase application under 35 U.S.C. § 371 of International Application No. PCT/EP2019/075850, filed on Sep. 25, 2019, and claims benefit to German Patent Application No. DE 10 2018 217 901.8, filed on Oct. 18, 2018. The International Application was published in German on Apr. 23, 2020, as WO 2020/078679 A1 under PCT Article 21(2).

FIELD

The invention relates to a method and an apparatus for optimizing workflows of one or more microscopes, microscope systems or a grouping of microscope systems by means of trained models, which can be used in microscope measurements for prediction purposes (inference).

BACKGROUND

Microscopes find use in very different fields and can be utilized to examine very different specimens and objects. Specimens can be very different and recorded data can have great variability, especially in basic research or clinical application. Moreover, experiments or measurements with microscopes are becoming ever more comprehensive and complicated in order to obtain as much new information and insight as possible from the measurements. The automation of measurements by microscopes allows this to be carried out without a human being permanently in attendance. However, the prior art highlights quite a few disadvantages and problems of existing systems, which are considered below.

By way of example, previous microscopes are able to carry out experiments according to a preprogrammed scheme. However, this results either in recording too much non-informative data or in important biological phenomena possibly being missed since preprogrammed schemes do not allow an intervention in a workflow without a complete termination of the experiment if the biological phenomenon was not part of the preprogrammed scheme. This has high costs for data storage and evaluation as a consequence since a greater number of experiments have to be carried out in order to be able to observe the biological phenomena.

Moreover, previous systems can only support a restricted stock of applications which are defined in advance, particularly in relation to image processing. Therefore, the systems become obsolete and often cannot be upgraded, or can only be upgraded with great outlay, in terms of the spectrum of application. In the case of conventional systems, high costs may be incurred for a new purchase or the purchase of additional upgrades from third-party suppliers. Microscopes with feedback by the image processing can capture image recording conditions on the basis of results of image processing operating in asynchronous fashion. However, this method offers only low accuracy and can only be used for specific cases of an examined specimen. Unknown applications or specimens with great variability require more time outlay in order to newly develop the image processing for each individual problem from the bottom up. Moreover, previous feedback methods have usually been ineffective since reliable feedback is only possible after a sufficiently large number of recorded images.

Until now, neural networks have only been used for the evaluation and/or preparation of images recorded by a microscope. By way of example, US 2010/0183217 describes the use of a neural network for restoring noisy images, or images with a low color or grayscale value gradient, which have been recorded by an electron microscope. A disadvantage of methods that are based on the postprocessing of images in order to optimize results of a measurement is that information from the recorded original images may be lost as a result of the postprocessing and the cause of the image aberrations is not rectified since a neural network for postprocessing of images does not allow an intervention in a workflow during a measurement.

Moreover, the deviation of device parameters from the norm is problematic, for example if photosensors are overexposed, an illumination malfunctions, the temperature is too high or the focus drifts. Usually, the experiment then cannot be used beyond this point and needs to be repeated in its entirety, causing great costs and a great time outlay. Alternatively, previous systems may also malfunction unexpectedly, for example on account of a state of the microscope not being monitored. This malfunction, which is unpredictable by the user, may be accompanied by costs relating to ruined experiments and faults in the operating procedure.

SUMMARY

In an embodiment, the present invention provides a method for optimizing a workflow of at least one microscope or microscope system. The method includes the following steps: a) implementing a workflow by one or more components of at least one microscope and/or microscope system, wherein the workflow comprises a capture of first data; and b) determining a trained model for the workflow, at least in part based on the captured first data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
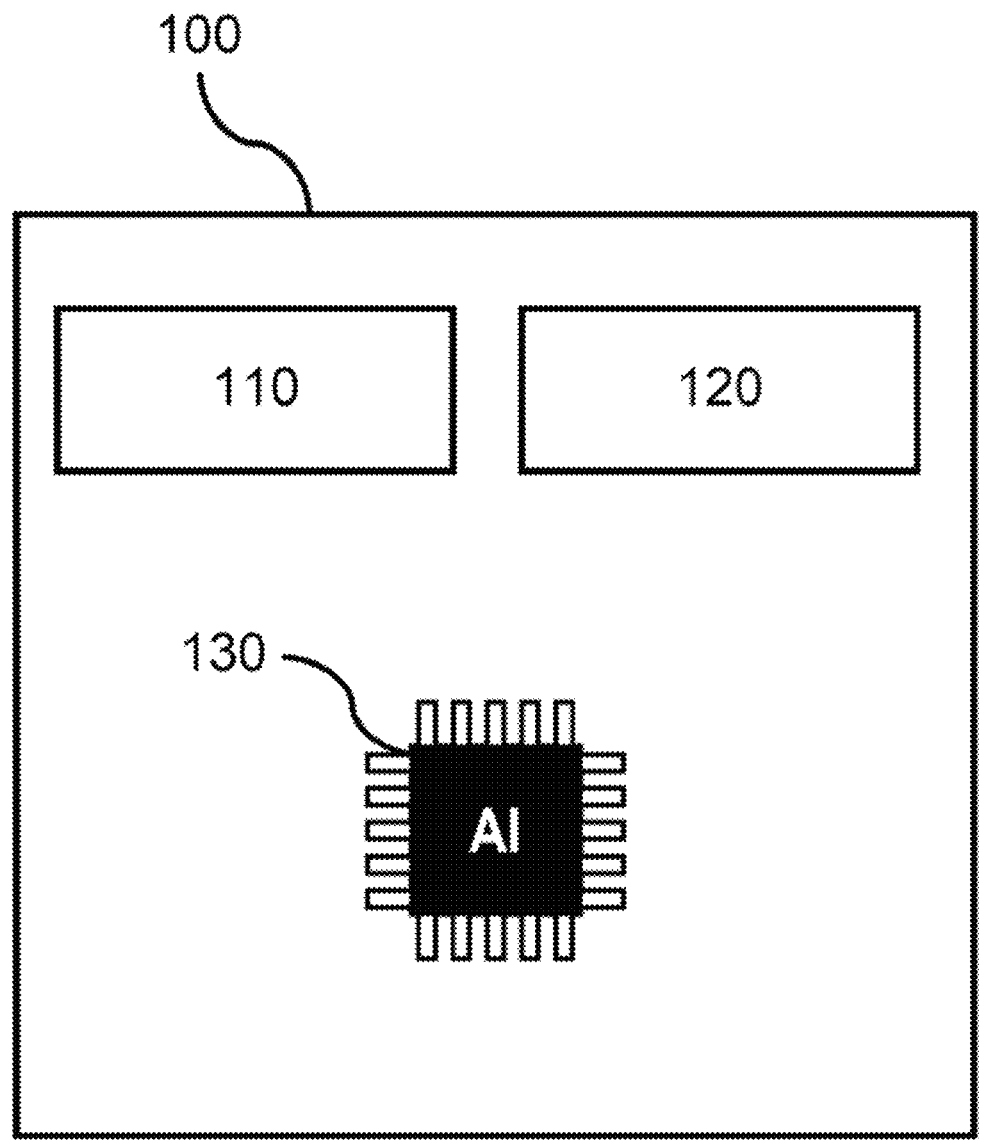
FIG. 1 shows a schematic illustration of an apparatus according to the invention for optimizing workflows according to one embodiment.

Embodiments of the present invention optimize workflows that are implemented by a microscope or the components thereof.

Embodiments of the present invention solve the aforementioned problems and achieve to optimize workflows that are implemented by a microscope or the components thereof by way of a method and an apparatus The method comprises the steps of implementing a workflow by one or more components of at least one microscope and/or microscope system, wherein the workflow comprises a capture of first data, and of determining a trained model for the workflow, wherein the determination is based at least in part on the captured first data.

The apparatus according to an embodiment of the invention comprises one or more processors and one or more computer-readable storage media, wherein computer-executable instructions are stored on the one or more computer-readable storage media, said instructions, when executed by the one or more processors, cause one or more components of one or more microscopes and/or microscope systems to implement a workflow, wherein the workflow comprises a capture of first data, and one or more trained models to be determined for the workflow, at least in part on the basis of the captured first data.

The method according to embodiments of the invention and the apparatus according to embodiments of the invention are advantageous in that trained models which can be based on neural networks, for example within the sense of deep learning, are determined for the workflow implemented by the one or more components of one or more microscopes and/or microscope systems. This facilitates an automation of workflows of one or more microscopes for specimens with a high variability and allows an optimal workflow to be implemented depending on the specimen. Moreover, trained models facilitate precise predictions for a workflow on the basis of little data and, in comparison with methods from the prior art, facilitate a better generalizability for previously unknown applications.

The method according to embodiments of the invention and the apparatus according to embodiments of the invention can each be improved further by way of specific configurations. Individual technical features of the configurations of the invention described below can be combined with one another and/or omitted as desired, provided the technical effect obtained by the omitted technical feature does not matter.

In one embodiment, determining the trained model comprises an analysis of the first data by means of one or more trained master models. The one or more trained master models can determine the one or more trained models on the basis of information from the analysis of the captured first data. In one exemplary embodiment, the step of determining the one or more trained models comprises selecting, from a multiplicity of models, one or more models that has/have been trained in a certain way. By way of example, the one or more trained master models can classify the captured first data in a first step and select, from a multiplicity of models, one or more trained models that fit to the captured data or to the class of data, which trained and fitting models can then be used. The multiplicity of models can comprise a multiplicity of trained models and can be classified by a field of use and/or can be organized hierarchically. Individual trained models from the multiplicity of trained models can be specialized for individual types of specimens, experiments, measurements, or device settings.

In one embodiment, the method moreover comprises the step of an automatic application of the one or more determined trained models. The one or more determined trained models can be applied to the first data or to newly captured data. By way of example, after the one or more trained models were determined, new data can be captured in a further step and the one or more determined trained models can be applied to the newly captured data. Moreover, the method can comprise the step of making at least one decision relating to the workflow on the basis of the application of the one or more determined trained models. Determining the one or more trained models facilitates a fast adaptation to specific conditions while a measurement is still ongoing. Moreover, determining the trained models allows a great variance in the measurement data since trained models are determined for and applied to a specific condition and the models trained for the specific condition can have a high prediction accuracy. The hierarchic set up and the selection of trained models facilitates the step-by-step selection of a fitting model for a fitting measurement.

In a further configuration, the method for optimizing workflows can comprise the step of adapting one or more trained models. The step of adapting can comprise training part of the trained model, at least in part by means of aggregated data. In addition or as an alternative thereto, the adaptation step can comprise training the trained model by means of aggregated data, wherein the aggregated data originate from one or more sources. The aggregated data can comprise data uploaded to a cloud, a server, or a workstation in automatic, semiautomatic, or manual fashion. The aggregated data can comprise at least one of the following: the trained model or parts thereof, captured data which comprise the input data for the trained model, annotations of the input data, hidden representations of data, assessments of output values of the trained model applied to the input data, and user inputs.

Consequently, trained models can be modified or adapted for a workflow with little outlay in this advantageous configuration, in order to update trained models or specify these for a field of application. This facilitates a continuous development of the models and optimization of workflows. Moreover, post training or adaptation of the models can extend the field of use of the microscopes, or make this more precise, without needing to purchase new image processing software or reprogram said image processing software from the bottom up.

In one configuration of the method according to the invention for optimizing workflows, the method comprises the step of capturing and/or transmitting second data. The capture of second data can comprise the capture of a user-defined state that deviates from a state defined by the trained model, wherein the second data comprise a representation of the deviation of the state defined by the trained model from the user-defined state or a representation of the user-defined state. The trained model can be adapted or trained further by means of these data and thus be trained for settings desired by the user. This opens up new fields of application and can optimize workflow in relation to user-friendliness of the microscope and adapt the latter to the wishes of the user. In one exemplary embodiment, the captured second data can be transmitted to a cloud, a server or a workstation and can be aggregated there and can be used for the training of new models or the improvement (adaptation) of existing models. Thus, the microscope can become a data source for the development of further models that are based on machine learning, deep learning, or similar methods. The trained models can be trained on a cloud, a server or a workstation using data from one or more sources and can be loaded onto microscopes or microscope systems and/or onto attached components of microscopes or microscope systems.

In one embodiment, the method can be implemented as a web service, wherein the one or more trained models are applied in a cloud. Alternatively, the one or more trained models can be applied on a workstation, on the at least one microscope or microscope system and/or on attached components of the at least one microscope or microscope system.

In one configuration of the apparatus according to the invention, the application of the one or more trained models can comprise an analysis of the captured first data. The apparatus can be a part of the microscope (e.g., a microcomputer) or an embedded computer or system computer, which are located separately from the microscope and are connected to the microscope via a network. Moreover, the apparatus can facilitate the implementation of trained models with maximum speed or in real time. The microscopes can consist of functionally networked subsystems or modules, which are connected to one another.

Subsystems, components, or modules all comprise systems which contribute to achieving the stated object within the scope of a microscopy object. In this case, the microscopy subsystems can be situated on the microscope itself, for example cameras, detectors, microscope stages, drives, software modules, firmware modules, etc. However, they can also be spatially separated from a microscope, for example databases, network links, analysis software, microtomes, pipetting machines, robots, other microscopes, clusters of microscopes or computers, etc.

In embodiments, the one or more processors of the apparatus according to the invention can comprise computing accelerators, such as graphics processing units, GPUs, TensorFlow processing units, TPUs, application-specific integrated circuits, ASICs, specialized for machine learning, ML, and/or deep learning, DL, or field-programmable gate arrays, FPGAs, or at least one central processing unit, CPU. It is necessary here to make a distinction between training and inference, which comprises the application of the one or more trained models. During training, the model "learns", by changing its parameters, to make a certain type of prediction on the basis of hidden representations of the data which represent the "experience" of the model. The training requires large amounts of data, a large memory bandwidth and significant computing power. By contrast, the object of inference is to make a prediction as quickly as possible on the basis of one or more data points. Here, it is possible to make do with a lower computing power and less memory bandwidth. Consequently, the one or more trained models can be applied locally with little outlay in order to optimize a workflow of a microscope.

Models can be trained on workstations, servers, or a cloud since the training, as described, requires a large memory bandwidth and significant computing power. Models can be trained or retrained continuously in one or more configurations of the system according to the invention. The improved models can then be loaded onto the apparatus according to the invention. An advantage of this type of training or fine adjustment is that data can be aggregated from many sources (users, microscopes, or microscope systems) and can be used for the training or the fine adjustment. Moreover, it is possible to use data of microscopes that have already carried out measurements on unknown specimens or under new conditions. Consequently, a suitable trained model might already be available for a microscope even though this microscope has not yet carried out any measurement on the unknown specimen or under the new conditions.

The captured first data can comprise at least one of the following: image data, user inputs, error messages, metadata, parameter data of the one or more components, data relating to the progress of the experiment, information relating to reagents and materials, information relating to an object or a specimen, user-related data, and device data of devices that are controlled during the course of a measurement carried out by the one or more microscopes and/or microscope systems. Moreover, a master model can determine the one or more trained models for an application to the captured data or newly recorded data, preferably in automatic or semiautomatic fashion, on the basis of information from the analysis of the captured first data. These one or more trained models can be stored locally. Consequently, the apparatus can efficiently and quickly provide a model suitable for a certain measurement since the selection of the trained models occurs locally on the apparatus.

In one configuration, which is combinable with the preceding one, the apparatus according to the invention is configured to adapt at least one of the one or more trained models. The adaptation can comprise a training of only one part or of a plurality of parts of the at least one of the one or more trained models. In addition or as an alternative thereto, the adaptation can comprise a training of the at least one of the one or more trained models by means of second data. By way of example, the second data can comprise annotated first data. The annotations of the first data can comprise a target output value of the at least one trained model that is applied to the captured first data, or an assessment of the output value for a corresponding input value from the captured first data. At least one decision made on the basis of the application of the one or more trained models can be assessed in embodiments. By way of example, an illumination setting of a microscope, which was set on the basis of applying a trained model to image data, can be assessed as poor or insufficient by a user. The at least one of the one or more trained models can be adapted on the basis of one or more negative assessments by one or more users. The adaptation can lead to an increase in the prediction accuracy of the at least one trained model, which is applied to the captured first data, and can further optimize a workflow as a result of better predictions by the trained models. Trained models can be adapted (finely tuned) on the basis of aggregated second data, either locally on the apparatus or in a cloud. In contrast to the training of models, the adaptation of models requires significantly less training data in order to increase a prediction accuracy of trained models for a new albeit similar class of data, for which the models were not trained for at the outset.

In one or more configurations of the apparatus according to the invention, the latter, as part of a system, can communicate via a network connection with a server or a cloud. Specifically, one or more apparatuses according to the invention, workstations and microscopes or microscope systems, as well as the components thereof, can communicate with one another. In the process, data (captured data such as, e.g., images, device data, data relating to the progress of the experiment, models or parts thereof, hidden representations of data or data compressed in any other way in respect of the dimensionality thereof, input data for the at least one trained model, annotations about a target output value of the at least one trained model that has been applied to the input data, assessments of output values of the at least one trained model, parameter data of at least one of the one or more components, user inputs, error messages, information relating to reagents, specimens and materials, device data of devices that are controlled during the course of a measurement performed by the one or more microscopes and/or microscope systems, or user-related data) can be transmitted to a server or a cloud. Existing models can be finely tuned and improved there. Then, new, improved versions of the trained models can be loaded onto the apparatus or onto a plurality of apparatuses and applied, either automatically or semiautomatically. As a result, not only is there feedback between the progress of the experiment with a microscope and a static image processing process, but the feedback also acts on the content of the data or image processing and can change decisions and assessments made by the model during the progress of a measurement. Consequently, a workflow can be optimized and, in some cases, altered by the modification of models. A part of the software referred to as a model manager can adopt the control and organization of the communication of individual systems with microscopes or groups of microscopes and the version management of models. The model manager can be configured to implement the at least one adapted or finely tuned trained model on at least one of the one or more apparatuses. This may occur during the progress of a measurement or during the implementation of the workflow by the one or more components of the at least one microscope and/or microscope system.

In embodiments, the system can moreover comprise a model store as a software component on at least one of the one or more apparatuses. Trained models can be selected by means of the model store. By means of an interface and the model store, the system can download trained models for local implementation on one or more apparatuses. Moreover, the model manager can implement the one or more trained models on the at least one of the one or more apparatuses on the basis of an event. The event can comprise at least one of the following: receiving a request from a user via a web service, receiving a request on the basis of a result of an analysis of the first data by means of a trained model of the one or more trained models, receiving a request on the basis of a step in the workflow, receiving one or more results by data mining on model metadata, hidden representations or model parameters, receiving a request from a model store, and receiving a request on the basis of a capture of explicit model parameters which include experimental conditions. In one embodiment, the model manager can be configured to regulate rights management with the aid of a model database, wherein the model database stores at least one of the following information items: a model architecture, model parameters, model metadata and model rights, to control communication between individual apparatuses or groups of apparatuses of the one or more apparatuses, to manage versions of trained models, to assign a trained model to a field of application, to output a trained model within a container to the at least one of the one or more apparatuses, wherein the model manager comprises a container manager and the container manager creates or provides containers for executing trained models, and/or to manage metadata of trained models, wherein the metadata are used to manage the trained models and/or wherein the metadata comprise at least one of the following: a unique identification of the trained model, a version number of the trained model, an identification of the use location in a device, a category of the trained model, and an object of the trained model.

The present subject matter of embodiments of the invention is described in more detail below on the basis of exemplary drawings. The drawings show examples of advantageous configurations of embodiments of the invention.

FIG. 1 shows an apparatus 100 which comprises one or more processors 110 and one or more storage media 120. The apparatus can be part of a microscope and/or of a microscope system. Alternatively, the apparatus 100 can also be spatially separated from a microscope or microscope system and can be connected to the microscope or microscope system via a network. A microscope system can comprise one or more components, modules, microscopes and/or subsystems. The one or more components, modules, microscopes and/or subsystems can be interconnected via a network, for example a radio network. Microscope systems can comprise all subsystems, components, or modules which contribute to achieving the stated object within the scope of a microscopy object. In this case, the subsystems, components, or modules can be situated on the microscope itself, for example cameras, detectors, microscope stages, drives, software modules, firmware modules, etc. However, they can also be situated outside of the microscopes, for example databases, network links, analysis software, microtomes, pipetting machines, robots, other microscopes, clusters of microscopes or workstations, etc.

The apparatus 100 can be a microcomputer, workstation, computer, or embedded computer. The one or more processors 110 can comprise computing accelerators, such as graphics processing units (GPUs), TensorFlow processing units (TPUs), application-specific integrated circuits (ASICs) specialized for machine learning (ML) and/or deep learning (DL), or field-programmable gate arrays (FPGAs) or at least one CPU (central processing unit). An application-specific integrated circuit (ASIC, also referred to as custom chip) is electronic circuitry that can be realized as an integrated circuit. Since their architecture is adapted to a specific problem, ASICs operate very efficiently and several times faster than a functionally equivalent implementation by software in a microcontroller. TensorFlow processing units (TPUs), also referred to as TensorFlow processors, are application-specific chips and, in comparison with CPUs, can accelerate applications within the scope of machine learning. This or similar specialized hardware can be used to optimally achieve deep learning objects. The inference in particular, which requires orders of magnitude less of computational power than the training, i.e., the development of a model, also operates on conventional CPUs. Furthermore, in embodiments, the apparatus can comprise one or more trained models 130. With the aid of the one or more trained models 130, apparatuses can be rendered able to make decisions relating to a workflow of microscopes or microscope systems by means of artificial intelligence (AI). The one or more trained models 130 can be implemented by the one or more processors.

Inference comprises a transfer of a trained neural network to an application engine or apparatus, in such a way that the application engine or apparatus obtains additional "intelligence" as a result of this transfer. Thus, the application engine or apparatus can be put into a position to independently achieve a desired object. This consequently yields a cognitively extended apparatus. Cognitively extended means that the apparatus can be rendered capable of semantically identifying and processing image content or other data by the use of neural networks (or deep learning models) or other machine learning methods.

Figure 2:
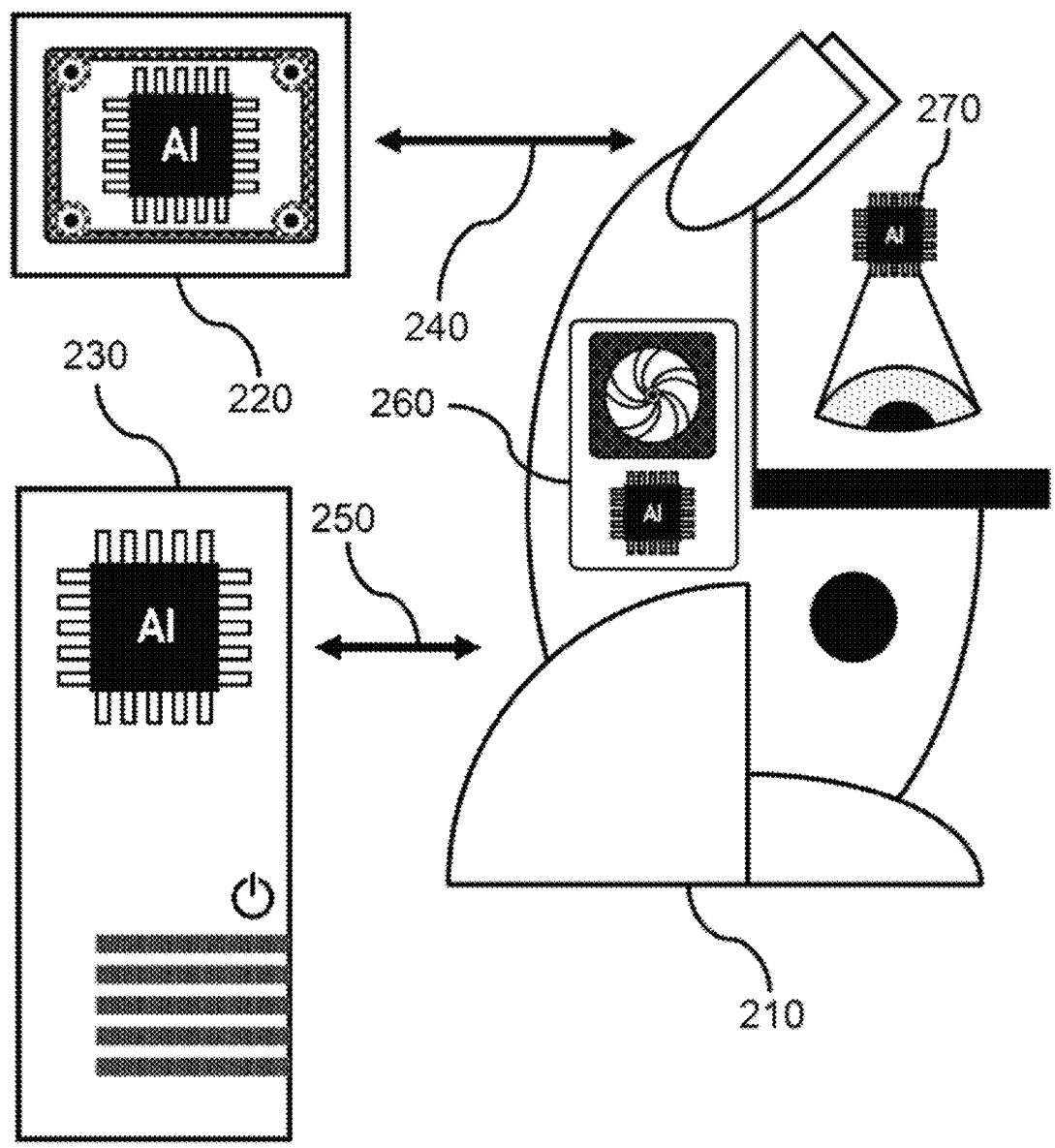
FIG. 2 shows a schematic illustration of a system according to the invention for optimizing workflows according to one embodiment.

FIG. 2 shows one embodiment of communication of a microscope 210 with AI-enabled apparatuses 220 and 230. Here, an individual microscope itself can comprise hardware acceleration and/or a microcomputer, which facilitate the implementation of trained models (e.g., neural networks) and render said microscope AI-enabled. Trained models can comprise deep learning result networks. These neural networks can represent results, with the latter having been learned by at least one deep learning process and/or at least one deep learning method. These neural networks condense knowledge collected in relation to a specific object ensemble in a suitable manner by automated learning, in such a way that a certain object can henceforth be carried out in automated fashion and with the highest quality.

The microscope 210 can comprise one or more components 260 and 270. Various components of the microscope, such as actuators 260 and sensors 270, can in turn be AI-enabled and comprise microcomputers or FPGAs. Microscope 210 comprises at least one component, for example sensor 270, which is configured to capture data. The captured data can comprise image data and metadata. The at least one component can comprise a plurality of different components, which each capture different data. In one embodiment, the captured data comprise structured data, such as extensible markup language (XML) data, for example. This facilitates the uniform provision and processing of the captured data by various components of one or more microscopes or microscope systems.

FIG. 2 and all following figures show microscopes as light microscopes in purely exemplary fashion. Microscopes can comprise all types of microscopes in embodiments. By way of example, a microscope can comprise one of the following: a light microscope, a stereo microscope, a confocal microscope, a slit lamp microscope, a surgical microscope, a digital microscope, a USB microscope, an electron microscope, a scanning electron microscope, a mirror microscope, a fluorescence microscope, a focused ion beam (FIB) microscope, a helium ion microscope, a magnetic resonance microscope, a neutron microscope, a scanning SQUID microscope, an x-ray microscope, an ultrasound microscope, a selective plane illumination microscope (SPIM) or an acoustic microscope, etc.

The microscope 210 is configured to communicate with an embedded system 220 and with its control computer 230. In one example, the microscope communicates simultaneously or in parallel with one or more embedded systems 220, which have hardware-accelerated AI, and with its control computer 230 via bidirectional communication links 240 and 250. Via the bidirectional communication links 240 and 250, e.g., a deep learning bus, it is possible to exchange data (such as, e.g., images, device parameters, experimental parameters, biological data) and models, the constituents thereof or hidden representations of data. In the process, it is also possible to alter the models during the progress of an experiment (by training or adapting parts of a model). Moreover, new models can be loaded onto a microscope or an apparatus and can be put into use. This can occur on the basis of recognition and interpretation of the data, which was performed by a model itself.

Models can also evaluate user-related use data, to be precise in such a way that the user-friendliness is improved. Data that are used to this end include, inter alia, mouse movements, number of clicks, time intervals between clicks, interaction with image data, and settings of device parameters undertaken by the user. Hence, data that are able to improve the operability of microscopes are available. Likewise, a trained model can adapt the user interface during the experiment in dynamic or non-dynamic fashion such that the relevant operating elements are prominently emphasized and/or brought into the spatial vicinity of one another, and therefore bring about an immediate improvement in the user-friendliness. This facilitates a continuous improvement of the user-friendliness with the aid of a learning user interface.

For the continuous improvement of models, data from as many users as possible are captured in one embodiment. The users can specify their preferences in respect of what data can be collected and processed anonymously. Moreover, there can be an option for assessing the prediction of models at the position in the user interface that is right for the progress of the experiment. In one example, the system could specify the number of transfected cells. In one embodiment, the user has the option of overwriting this value. Hence, a new data point is yet again available for the fine tuning of a model. Consequently, the user is provided with the advantage of being able to download repeatedly improved models. The manufacturer, in turn, is provided with the option of continuously improving their choice of products.

Figure 3:
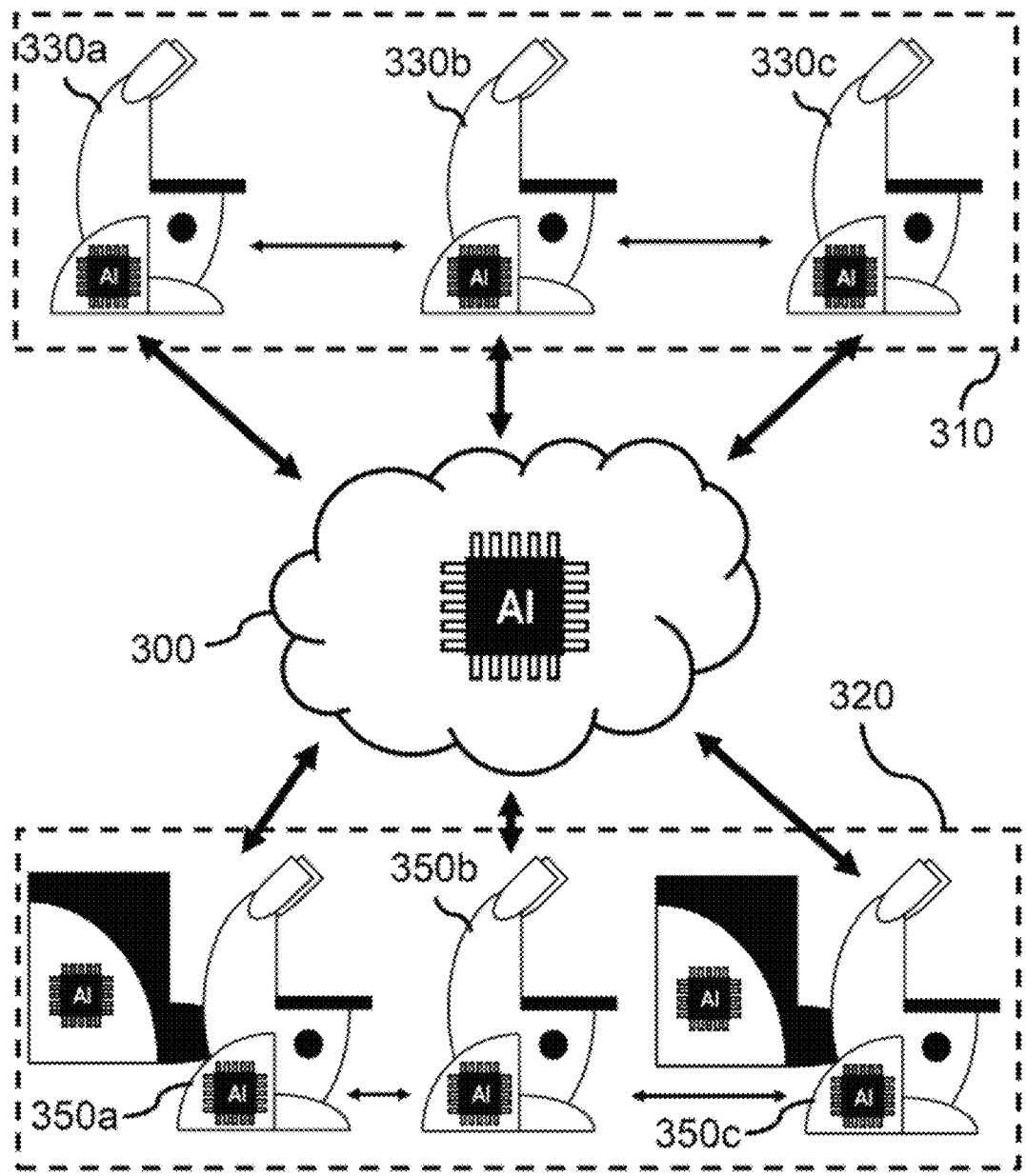
FIG. 3 shows a schematic illustration of a system according to the invention for optimizing workflows according to one embodiment.

FIG. 3 shows a plurality of microscopes 330a, 330b and 330c, which are combined to form a combined system 310 of microscopes. Moreover, FIG. 3 shows a heterogeneous combined system 320, which comprises microscope systems 350a and 350c, and also a microscope 350b. The combined systems are not restricted to a certain number of microscopes and/or microscope systems. The number of microscopes and microscope systems can vary, depending on field of application and scope of a measurement.

Microscopes 330 and microscope systems 350 can comprise one or more AI-enabled components. Like the microscopes of FIG. 2, microscope systems can communicate with other AI-enabled apparatuses or systems via a network. By way of example, the microscope system 350 can exchange data with one or more embedded systems and/or one or more control computers or workstations via bidirectional links. These data can comprise hidden representations, models or data captured by the microscope system or by components of the microscope system. Microscopes 330 and/or microscope systems 350 can comprise integrated microcomputers with hardware acceleration for AI models, such as, for example, GPUs, TPUs, application-specific integrated circuits (ASICs) specialized for machine learning (ML) and/or deep learning (DL), or FPGAs.

FIG. 3 moreover illustrates the communication of microscopes 330 and microscope systems 350 in combined systems. The microscopes 330 or microscope systems 350 of a combined system 310, and the attached components thereof, such as embedded computers or system computers, can communicate both with one another and with a cloud 300 or a server, for example for the purposes of exchanging data or models.

The communication in the grouping can serve for the coordination of complex, multimodal and/or parallelized experiments or measurements. There, it is possible to exchange control signals, data (images, device parameters, hidden representations) and models. In particular, models that were trained or adapted on an apparatus in conjunction with one microscope, microscope system or combined system can be exchanged with the other apparatuses in the grouping, in other groupings or with the cloud. This is brought about by means of the management of user rights and project associations. In this case, the users themselves can decide who has the right to see and use the accumulating data flows and models. The models uploaded into the cloud aggregate the experience of all involved laboratories or installations and thus facilitate the continuous development of the models, which can be made available to all users.

As already mentioned, the exchange of models and data between workgroups and institutions can occur with and by way of the cloud. Microscopes, microscope systems and the attached components thereof can communicate among themselves and with workstations by way of a deep learning bus system. To this end, use can be made of specialized hardware and/or a TCP/IP network link or an equivalent. Using the same link, one workgroup communicates with other workgroups, which each comprise one or more microscopes or microscope systems, with server systems, the cloud and/or other institutions. All learned information items, data, hidden representations, models and metadata can be exchanged among one another and can be managed by a model manager and managed with rights management.

The structure for communication between microscopes and the components thereof, described in FIGS. 2 and 3, can also be used for the communication between microscopes, microscope systems and groupings of microscope system, and workgroups and institutions. For communication purposes, use can be made of a deep learning bus system having the following properties:

Networking of all subsystems, i.e., microscope components, sensors, and actuators, with one another and with suitable models. These subsystems can be intelligent, i.e., themselves have neural networks or machine intelligence, or non-intelligent.

The networking of all subsystems and modules, microscopes and microscope systems yields a hierarchical structure with domains and subdomains.

All domains and subdomains and also the associated systems and subsystems can be centrally captured and searchable so that a model manager (see FIG. 10) can distribute models thereto.

Specialized hardware can be used for the bus system for the purposes of communication in the case of time-critical applications. Alternatively, it is also possible to use a network link according to TCP/IP or any suitable web standard.

The bus system must manage at least the following data:
An ID for each component (actuators, sensors, microscopes, microscope systems, computer resources, workgroups, institutions); rights management with author, institution, write/read access of the implementing machine, desired payment system; metadata from experiments and models; image data; models and the architecture thereof with learned parameters, activations and hidden representations; required interfaces; required runtime environment with environment variables, libraries, etc.; all further data provided it is required by the model manager and the rights management.

A hierarchical structure with domains and subdomains arises as a result of the multiplicity of different AI-enabled components. All components are captured in and retrievable from a repository. There is rights management on each level (i.e., the component attached to the microscope, microscope/microscope system, workgroup, computer resources, institution). As a result, a logical and hierarchic functional structure arises, which facilitates the cooperation of all actors.

The use of open standards for communication and data storage facilitates the extension of individual microscopes to form a grouping of microscopes or distributed workgroups, for example distributed worldwide, which are connected with one another, learn from one another and thus continuously improve the devices, both for individual users and in large research networks.

Microscopes consist of functionally networked subsystems, components, or modules, which are connected to one another. This connection exists on the level of microscope subsystems, whole microscopes and groupings or networks of microscopes. On each of these three levels it is possible to talk about modules or components in a respective higher level of abstraction. Each module communicates via slim interfaces, which are agnostic about the respective hardware or software in the interior of the module and which comprise a user rights management. Each module continuously records its state in standardized formats. This type of communication and capture of state parameters is also applicable to non-microscopes, such as laboratory automation, specimen preparation devices, devices for pipetting liquids, environmental chambers, and much else.

Communication can be implemented both between an individual microscope (see FIG. 2), a microscope system (see FIGS. 2 and 3) or a grouping of microscopes and microscope systems (see FIG. 3) and the respective attached components (e.g., actuators and sensors), embedded computers, one or more system computers and the cloud (see FIG. 3). What is important in this embodiment is the option of continuously exchanging data, models, and hidden representations of the data, which can be considered to be forms of the data reduced in terms of dimensionality, and synchronizing these with the cloud. The latter facilitates the continuous development of the models, which can thus profit from the collective experience of all users and achieve new objects. Otherwise, large amounts of data would be required for the training of deep learning-based models.

A plurality of forms of feedback arise as a result of the networking of the microscopes, microscope systems, combined systems, and the cloud:

1) Feedback microscopy: During the progress of an experiment, the data are assessed asynchronously by a predefined model or image processing procedure and decisions that influence the current experiment (e.g., in respect of the location of the recording, speed of the recording or image recording modalities such as illumination, detection or optical units) are made on the basis of extracted information.

2) Feedback into the model: Since the models can be continuously fine-tuned to a greater extent and since the prediction accuracy is evermore improved thereby, feedback arises which can alter and improve the model that assesses the data in ongoing fashion, even still during the duration of an experiment. In the feedback, an ensemble of processes or methods can be designed in such a way that results found by means of deep learning act back on the microscopy system or on microscopy subsystems, in such a way that a type of feedback loop arises. As a result of the feedback, the system is asymptotically transferred into an optimal and stable state or is suitably adapted (system settings) in order to be able to record certain objects more optimally.

3) On the basis of image recognition and/or assessment of recorded data, models can be replaced and downloaded during the duration in order to support different object types, different stains and, in general, different applications. This can even occur during the duration of an experiment or measurement, as a result of which the microscope becomes very dynamic and adaptable.

These forms of feedback facilitate a novel method for optimizing workflows during microscope measurements.

Figure 4:
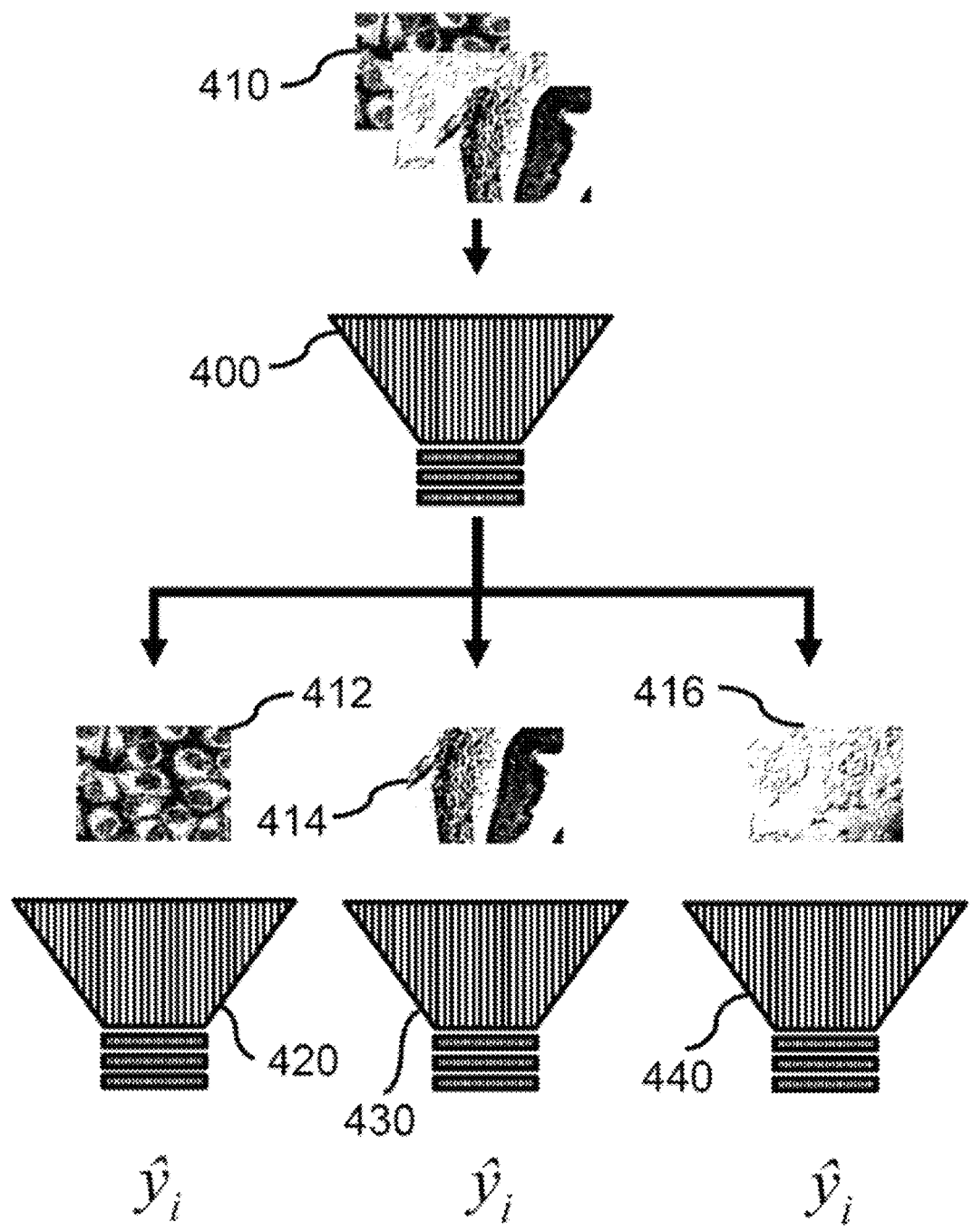
FIG. 4 shows a schematic illustration of a method according to the invention for the application of models according to one embodiment.

FIG. 4 shows a hierarchic arrangement for the inference of data with great variability. Thus, microscopes can be used in basic research and clinical applications, where image data and other datatypes differ significantly. Therefore, it may be expedient to undertake a preliminary classification step using a "master model" and automatically select the correct model for the corresponding data domain. This principle of using a hierarchic ensemble of models is not restricted to one data domain but can comprise different data types and domains. Likewise, a plurality of hierarchically organized model ensembles can be cascaded in order to order data domains according to a plurality of dimensions and nevertheless be able to carry out automatic inference despite different applications and variability in the data. FIG. 4 shows examples of data (image data 410 in this case) with great variability. Thus, these can be, e.g., fluorescence images of individual cells 412, H&E-stained tissue sections 414 or interference contrast images 416. In order nevertheless to be able to carry out the inference effectively and with great accuracy, a master model 400 is trained to distinguish between the various data domains of the image data 410. The result of this classification facilitates a determination of a suitable model 420, 430 and 440 for a domain of the correspondingly captured image data 412, 414, 416. The suitable model 420, 430 and 440 for this domain can then be automatically applied to the corresponding image data 412, 414, 416. Then, a prediction $\hat{y}_i$ can be made by means of the model 420, 430 and 440 and the inference thereof. A decision relating to the workflow can be based on this prediction. Thus, a "master" or world model can undertake a classification of the field of use and automatically select suitable models. By way of example, image data of H&E-stained tissue sections 414 can be captured during a workflow of a microscope. A master model 400 can be applied to these image data and can determine the trained model 412. The trained model 412 can be a trained model that was trained specifically for image data of H&E-stained tissue sections. The determined model 412 can then be automatically applied to the image data of H&E-stained tissue sections 414 and make precise predictions.

Figure 5:
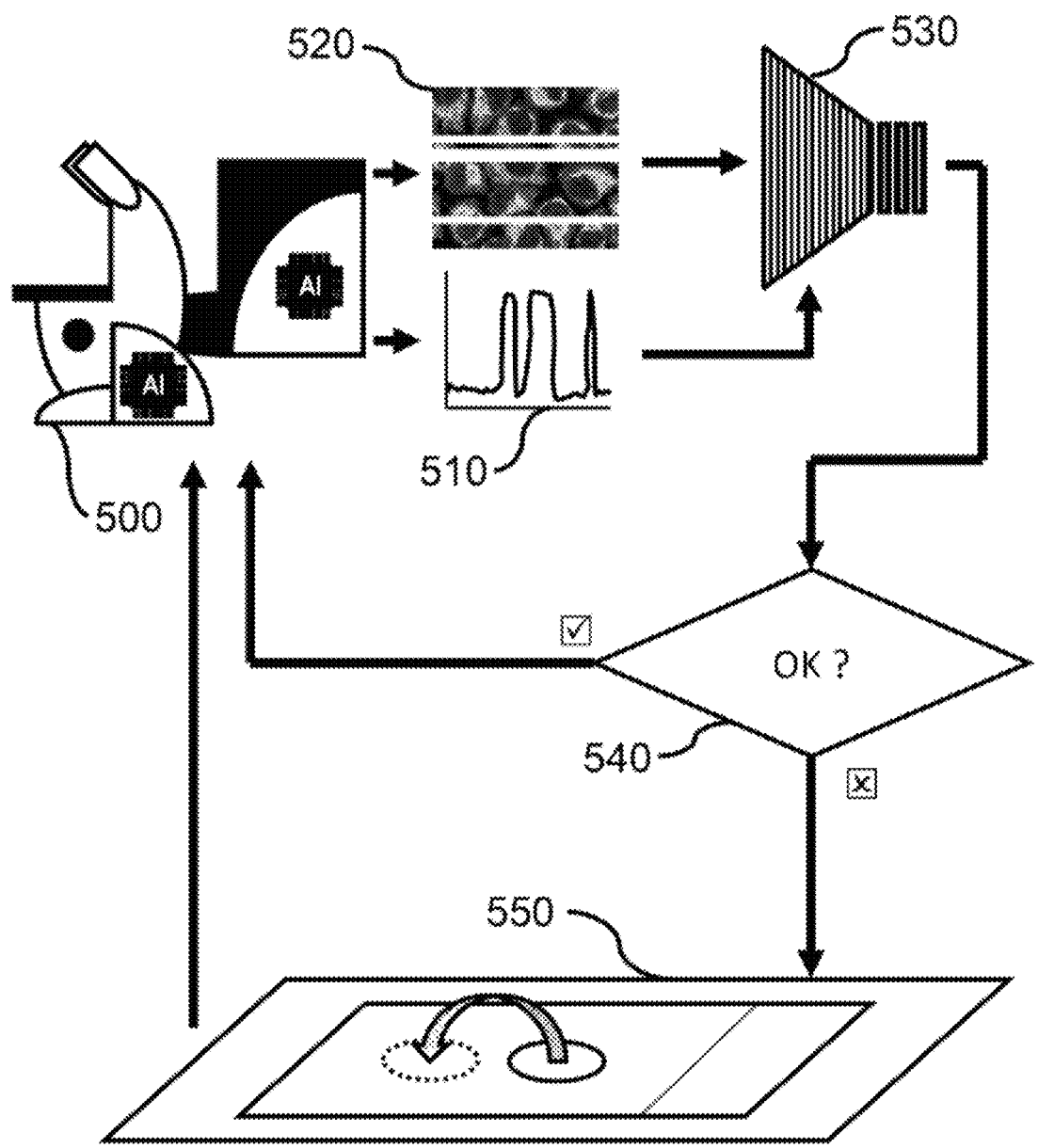
FIG. 5 shows a schematic illustration of a method according to the invention for the application of models according to one embodiment.

FIG. 5 shows the application of a trained model 530. The model 530 is applied to data 520 and 510, which were captured during a workflow by a microscope 500 and the components (e.g., sensors) thereof. The ongoing experiment or the ongoing measurement continuously produces data, which can be of very different types and which are captured by different components or sensors. In the case of FIG. 5, these can be images 520 and metadata or state parameters 510. The data 520 and 510 are analyzed by a pre-trained model 530. Then, a decision 540 can be made on the basis of the application of the model and/or the analysis. The trained model 530 can evaluate and/or analyze one or more data records of different types and, on the basis of the analysis, can make decisions that influence the workflow of a microscope and/or the components thereof. In the case of FIG. 5, model 530 can be used to determine whether all parameters are located in the normal range. The experiment or the measurement can be continued in this case. If not, for example like here in the case of the overexposure of a detector, the running experiment or the measurement can be paused and the recording of the last position can be repeated, as shown in step 550. To this end, parameters of components of the microscope 500 can additionally be altered in the exemplary embodiments or else error messages or warnings could be sent. Thereafter, the experiment or the measurement can be continued as planned. Any type of data, such as images or metadata, device parameters, predictions of other models or user inputs can be used for identifying errors. The decisions that are based on the analysis of the model 530 can have an effect on all control parameters of a microscope, microscope system, a grouping of microscopes or the attached components thereof, and on the process of other laboratory devices or mobile devices of the user or service technician. By way of example, an error message can be sent to a service technician or a cloud. If the error message is sent to a cloud, models can in turn be trained there on the basis of this and other error messages from the same source, or else from other sources, by means of artificial intelligence. The newly trained models can then make decisions to automatically rectify the errors and to thus prevent a termination of a measurement or of an experiment.

Moreover, recording state parameters of modules or components of a microscope system allows a continuous self-diagnosis. This self-diagnosis allows quality control of the experimental results, both during the process of a measurement and also thereafter. Furthermore, the self-diagnosis facilitates the automatic, semiautomatic, or manual control by a technical service or the trigger for service operations when necessary, and so a frictionless procedure of experiments and/or measurements can be guaranteed. This facilitates great availability of the microscopes by monitoring device parameters on the level of individual modules or components.

Normal regions within the meaning of intervals with thresholds or expected values in the statistical sense can be defined for all device parameters captured by sensor or logically. When there is a departure from the set interval, the microscope can autonomously trigger an event which can be interpreted by other microscopes, the user, or the service technician. Likewise, a trained model can search for anomalies in data streams in unsupervised fashion and can likewise trigger appropriate events should anomalies occur. Once again, the event is sent via the network, for example via web APIs and thus reaches the control software of other microscopes, the user interface of the user, the mobile device of the service technician or the cloud as training data.

Embodiments have an intelligent error management. Error messages generated by the microscope can be collected continuously and evaluated by models. In the development division of the manufacturer, there can be an analysis of these error messages and a creation of training data sets for supervised or unsupervised training of models, which are then able to identify certain errors and automatically introduce measures to overcome these. These trained models can then additionally be loaded onto an apparatus according to the invention, for example via Wi-Fi, cable, Bluetooth, light, stick, disk, etc., and can be carried out. This allows the microscope to develop a type of "self-healing power" by virtue of the procedure not simply coming to a standstill or the experimental data becoming unusable in the case of an error but the microscope instead reprogramming its own state or altering device parameters, in such a way that a frictionless procedure is still possible (see FIG. 5). Moreover, the microscope can inform the user about problems via the mobile device and request an input to make decisions. Likewise, an unsupervised learning-type training of models is possible, which can already take place during the experiment in order, for example, to identify unusual or dangerous scenarios. Then, the applicant can be warned in this respect and can introduce countermeasures or can be informed about potentially damaging operating mistakes. This can increase the safety during experiments.

The experimental results are possibly adversely affected if variations occur, for example in terms of the laser power, the gain voltage of sensors or the temperature of environmental chambers. Recording and automatically identifying this with the aid of models allows an assessment to be made about the quality of the data. The microscope can thus repeat entire experiments or parts thereof if quality problems with the data were registered and identified during the recording. This improves the productivity of the user since unnecessary manual repetitions are avoided and the interpretability of the data increases because unexpected phenomena in the biological system can be correlated with device parameters. Thus, for example, cell division could slow down if the temperature drops. This can be identified automatically, and the user is notified and can make a decision as to whether the experiment should be continued, terminated, or repeated. The recorded device parameters and state parameters and the interpretation thereof by the model and the model used to this end can be stored together in an open format. Hence, the experiment becomes fully reproducible.

In cases where data are available about the experiment, the specimen, the specimen preparation and the progress of the experiment, predictions can be made by way of the model in respect of when necessary reagents are in short supply and these chemical or biological reagents can be ordered automatically or semiautomatically. Automatic or semiautomatic repeat orders of reagents and materials guarantee a frictionless and uninterrupted progress of long-term experiments or applications in industry.

The models selected by the model manager or user or AI applications based thereon can be quickly provided while an experiment is running, beforehand or afterwards. Moreover, they can be versioned and managed independently of the image acquisition software and can be scaled to very different systems or system components—from microcomputers via embedded computers and via workstations up to the cloud. A container technique is used in a preferred embodiment. Such a container (FIG. 6, 610) contains all environmental variables, the namespace and the runtime environment and all libraries, which are required for the operation of an application or model, and the model or the application itself. In the following figures, the containers are illustrated only in exemplary and non-restricted fashion. By way of example, other programming languages could also be used instead of Python.

Figure 6:
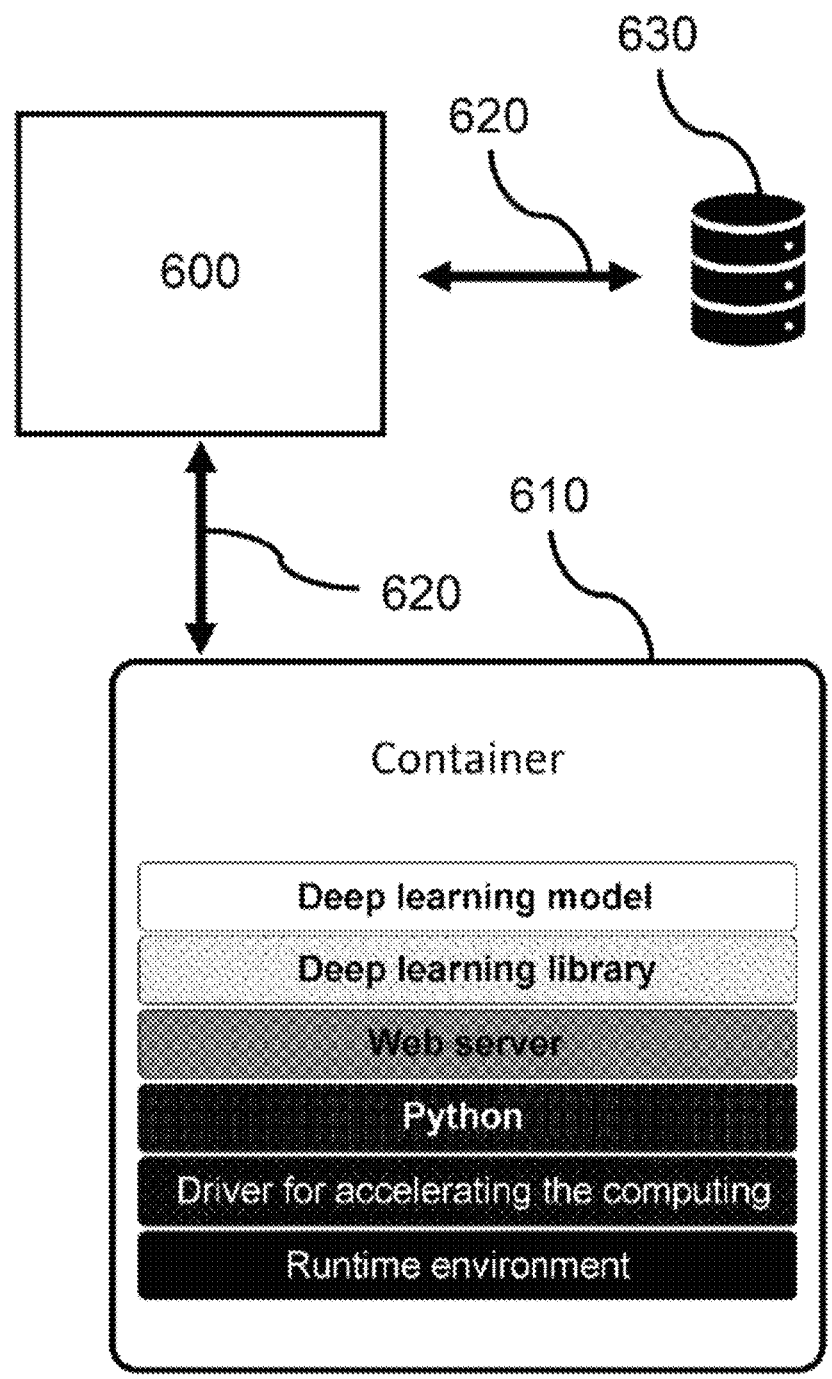
FIG. 6 shows a schematic illustration of a system according to the invention for the provision of deep learning models in containers according to one embodiment.

FIG. 6 shows the provision of deep learning models in containers. The runtime environment, all necessary drivers and libraries, and the deep learning model or an application based thereon can be provided in a container. The image recording software 600 communicates with this container 610 via a suitable interface, which meets the requirements of the deep learning bus system 620. For the inference application, the input/output of data is adopted by the image recording software.

The image recording software 600 can be a software component, by means of which it is possible to control one or more microscopes or microscope systems and/or the components thereof. Moreover, the image recording software 600 can represent a user interface. The basic management of the captured images, experiment data, experiment metadata and training results can be adopted by the image recording software 600.

Figure 7:
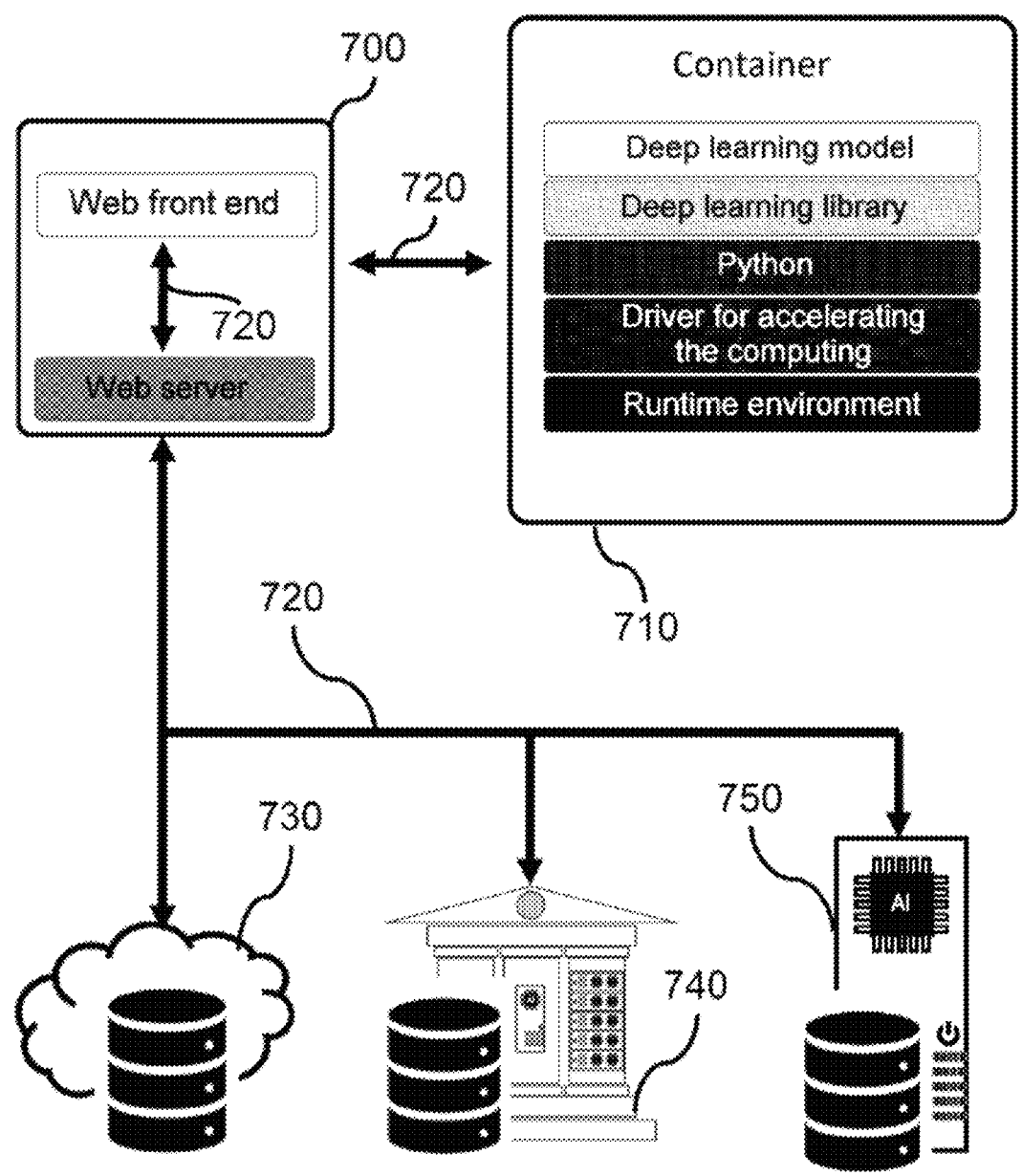
FIG. 7 shows a schematic illustration of a system according to the invention for the provision of deep learning inference as a web service according to one embodiment.

FIG. 7 shows the provision of deep learning inference as a web service. A web server and the associated front end are started in a container 700. The user communicates via the front end and transmits the task. The web server calls data and models with the aid of the model manager from the cloud 730, a research institute 740 or the workstation 750 of the user. By way of the web interface of the deep learning bus system 720, the web application communicates with a deep learning container 710, which comprises the application of a trained model (for the inference) and which transmits a result back to the web server. The latter calculates the output and displays it to the user via the web front end. Where necessary, the result can also be transmitted to the workstation or the microscope (system) of the user at the same time and can influence the progress of an experiment or adopt control tasks there.

The use of containers facilitates scaling from microcomputers, via embedded systems, via workstations with GPUs, TPUs, ASICs or FPGAs up to cloud applications, without requiring any change in principle in respect of the models and the directly associated software required for the operation thereof.

Figure 8:
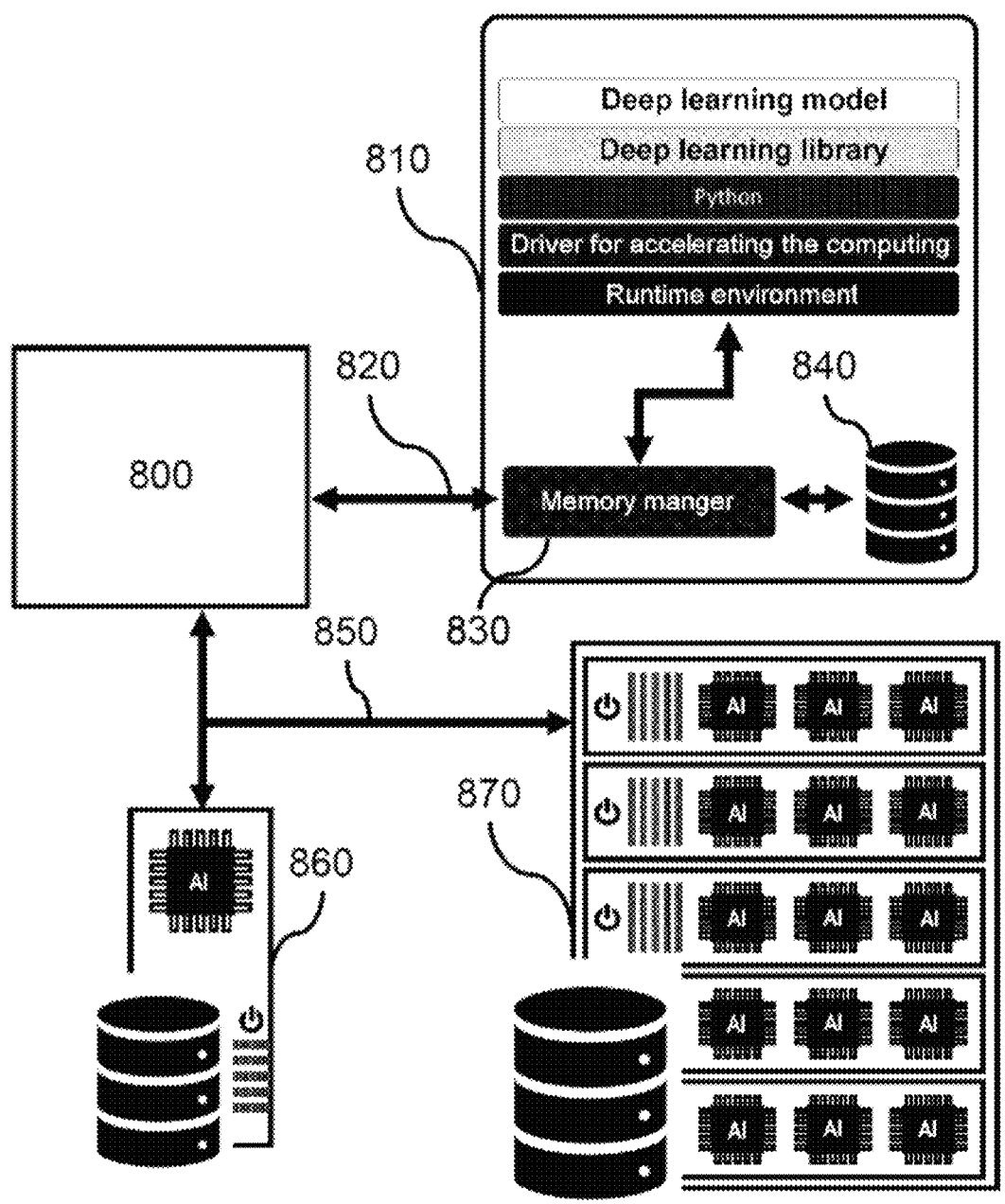
FIG. 8 shows a schematic illustration of a system according to the invention for training models on a workstation or on a server in a local network according to one embodiment.

FIG. 8 shows the training of models on a workstation or on a server in the local network. The image recording software 800 is connected to the deep learning container 810 via the deep learning bus system 820 and determines the dimensions of the input and/or output data. For the training, the deep learning container 810 runs on a computer resource on which the data are also available. Since the training requires a maximum memory bandwidth, the deep learning container also contains a memory manager 830, which, when required, can buffer data on a fast local memory 840 and can provide data batches to the deep learning model. The experiment data, experiment metadata and training results are stored on a workstation 860 or a server in the network 870 by the image recording software 800 via the deep learning bus system 850. The computer resource on which the deep learning container 810 runs can be identical to 860 or 870 in order to keep the data transfer paths short. The recording software 800 can be executed on the local workstation 860.

These models can be trained by deep learning processes. This comprises an orderly application of at least one deep learning method, but preferably a plurality of deep learning methods, in order to achieve a certain target. Here, the target can relate to the analysis (e.g., image analysis, object recognition, context recognition, etc.) or else relate to the control (feedback microscopy, sensor adaptation, method adaptation, system optimization, etc.). Deep learning methods can comprise a sequence of method steps which subdivide a procedure into comprehensible steps, to be precise in such a way that this procedure is rendered repeatable. The method steps can be certain deep learning algorithms. However, these can also be processes by means of which a network learns (back propagation); for example, this can be the way in which data is collected or the way in which data are processed by way of hardware, etc.

Figure 9:
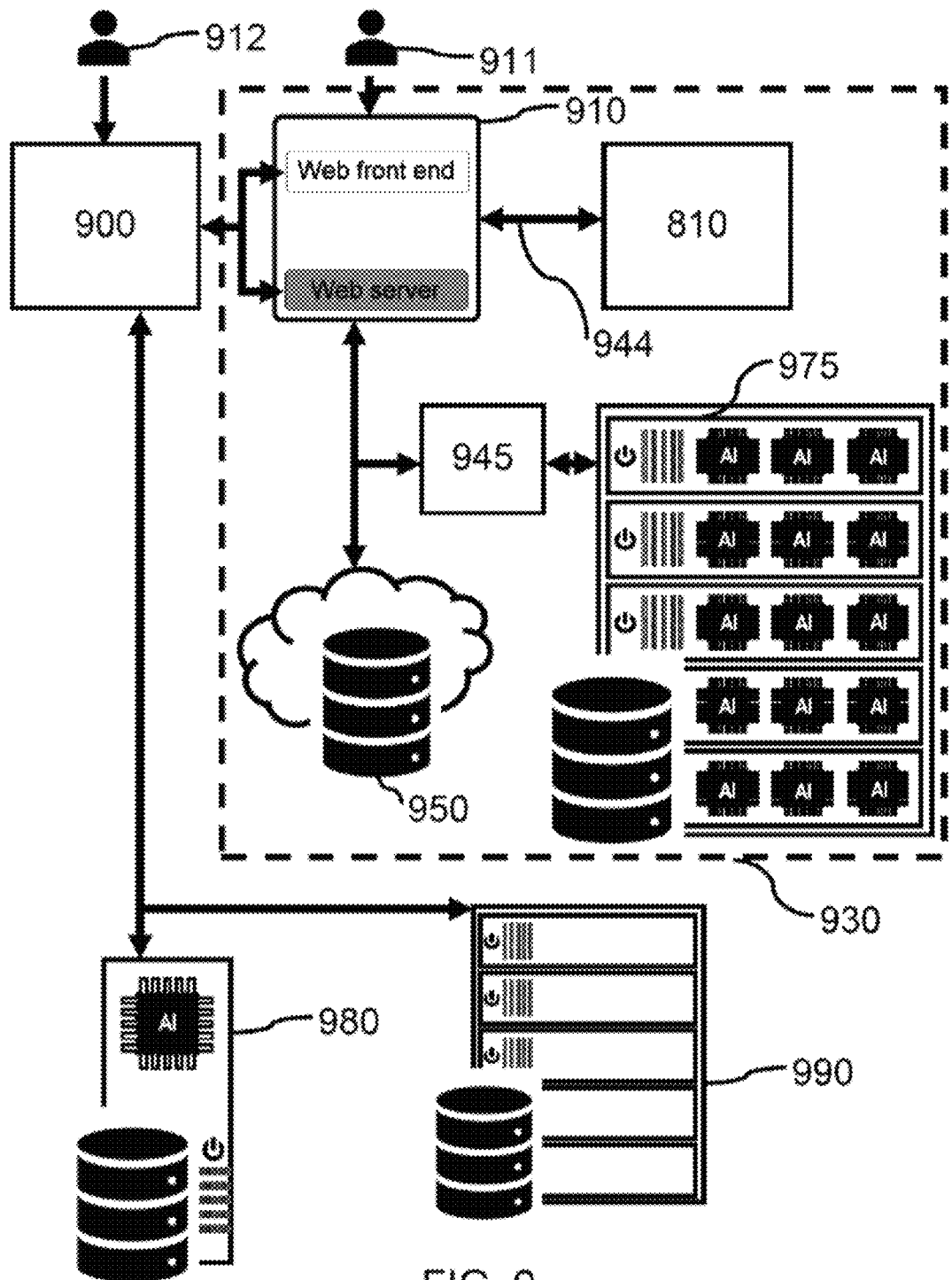
FIG. 9 shows a schematic illustration of a system according to the invention for the training of models as a web service in the cloud according to one embodiment.
Figure 11:
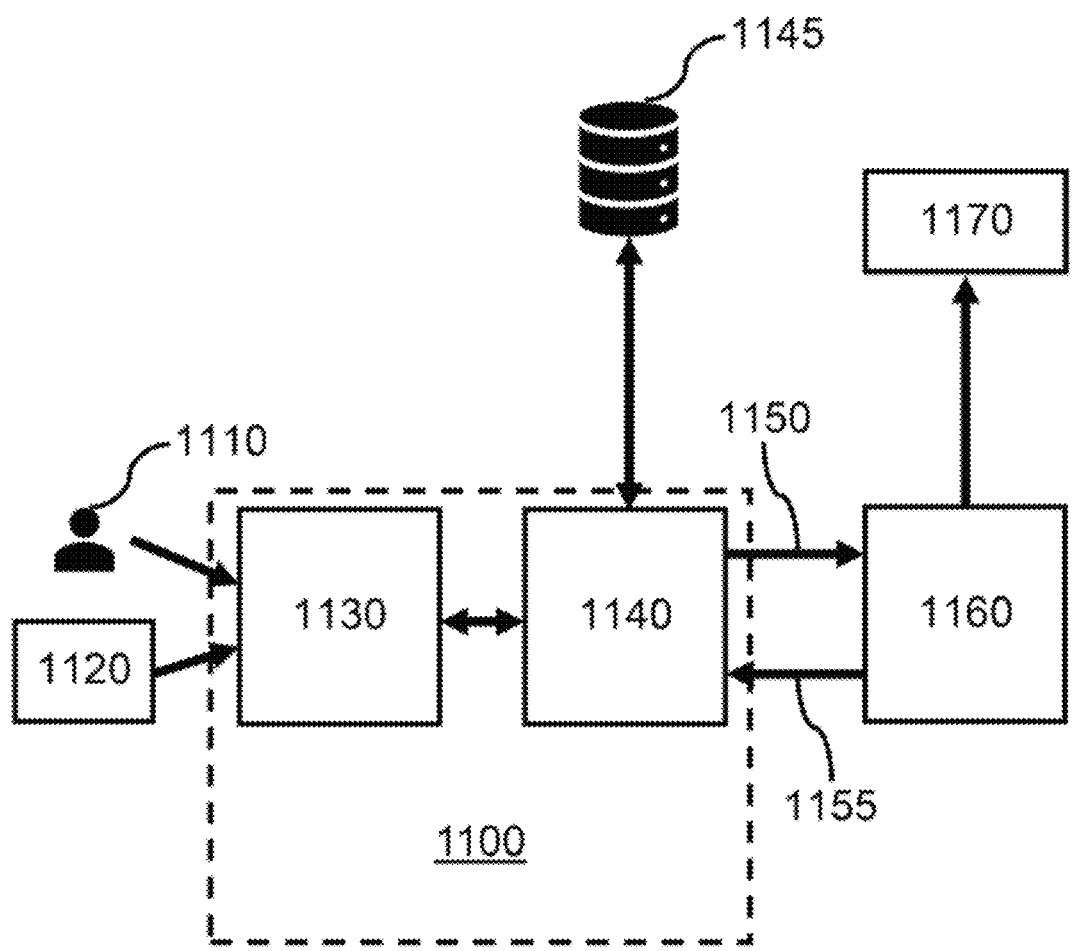
FIG. 11 shows a schematic illustration of a model store according to one embodiment.

FIG. 9 shows a system for training models as a web service in the cloud. This form of training supports three types of application. In the first case, the user 911 interacts with a web application 910 in the cloud 930 in order to train models for certain applications. As a rule, this is implemented via the model store (FIG. 11). In the second and third case, the user sits at their workstation and operates the image recording software 900. The latter communicates with a web application 910 in the cloud 930. This is implemented by the deep learning bus system, either under interactive control by the user, once again by means of a web front end, or under programmatic control via an API directly with the web server. The web server can buffer store data in the cloud or request additional data from a memory 950. With the aid of the model manager 945, the web server takes care of the provision of computing resources for the training. The data required for the training are sent via the deep learning bus system 944 to a deep learning container 810, which may correspond to the deep learning container 810 of FIG. 8. The latter uses a memory manager 830 and a fast local memory 840 for buffering the data for fast training. The training is implemented on a computing resource 975 with significant computing power. The fast local memory 840 can represent a dedicated computing resources or be part of the computing resource 975. Thus, the cloud service can be implemented on the computing resource 975, in order to keep data paths short, or on computing resources of third parties (for example, if the training is offered as a service via the model store). A fast NVMe-SSD or a future form of fast nonvolatile memory can be used for the local memory. The results of the training are available on the image recording software, the latter being able to store said results locally 980 or on a server 990 and also being able to download further data therefrom. As a rule, the recording software 900 is executed on the local workstation 980.

Returning to Application 1: A user 911 may require training of a new model but not have dedicated resources. They can then use the web application 910 of a cloud 930 in order to search for finished models or providers of services and computing resources with the aid of the model store (FIG. 11). The web server uses the model manager 945 to find suitable finished models or to undertake the training of new models on a powerful computing resource 975. In this case, the user 911 would upload the data via a web interface and the web server can download possibly required further data from the web or a cloud. The data is sent to a deep learning container 810 via a deep learning bus 944. Since data batches have to be downloaded quickly for the training, the deep learning container can comprise a fast buffer store which is managed by a dedicated memory manager (see also FIG. 8 in this respect). This is the logical level. On the hardware side, the fast buffer memory (e.g., fast NVMe-SSD memory) can also be identical to the implementing computing resource 975, in which the deep learning container can also run.

Application 2: A user 912 is seated at the microscope and operates the recording software 900. The latter can offer to train new models and bring along a dedicated user interface to this end or offer a web front end. Thus, the user 912 can interactively place the order.

Application 3: The recording software 900 controls the training in programmatic fashion. Consequently, the training is part of the experiment and can influence the course thereof. By way of example, this is necessary if a model trained in advance should be fine tuned with new, previously unknown data but this is not possible or not desirable locally, or else if the service provider or a third party has a suitable model and makes this model or the training of new models available as a service in the model store. Within this meaning, services can be the provision of pre-trained models, a training environment in a preconfigured container, computing resources, a creation of new models and the training thereof, manual or automated annotation of available data, or combinations therefrom.

Figure 10:
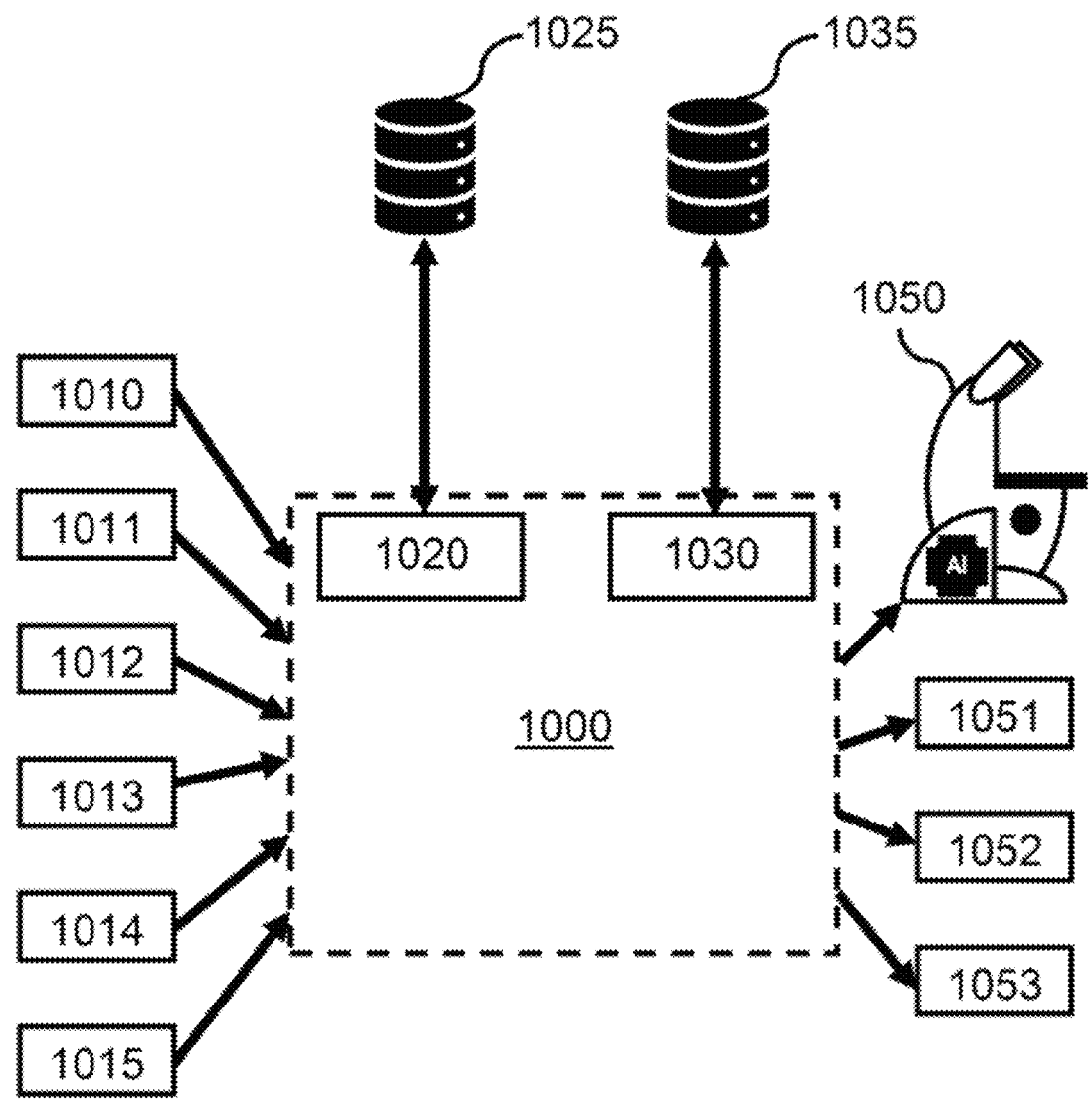
FIG. 10 shows a schematic illustration of a model manager according to one embodiment.

FIG. 10 shows the schematic structure of a model manager 1000, which is configured to provide the correct model for the correct application and machine. Requests arrive at the model manager in different ways, specifically from the user via a web service 1010, as a result of image processing 1011, as a step in the process flow of an experiment 1012, as a result of data mining on model metadata, hidden representations or model parameters 1013, as a request from the model store 1014 or as explicit model parameters which are associated with experimental conditions 1015. There is rights management 1020 within the model manager with the aid of a model database 1025. The following information can be stored therein: The model architecture (the topology of the "neural network" with all computing steps), model parameters ("model weights", i.e., the learned information), model metadata and/or model rights. Container management 1030 may likewise occur within the model manager. The container manager facilitates the provision ("deployment") of the models in containers (e.g., docker containers). To this end, the container manager makes use of a container database 1035, which can contain the following information: pre-made images and instructions for producing images. The container manager can find the suitable container image or produce a new one on the basis of the model metadata from the model database 1025. The model manager outputs the desired model within a container to the corresponding target system or the corresponding apparatus. This can be a microscope/microscope system 1050, possibly with an embedded system or attached components, a web service 1051, the model store 1052 or a computing resource 1053. The latter can be embedded systems, microcomputers, microscope workstations, or a server.

The model manager adopts all tasks that serve to select the right model for the right purpose, to manage metadata for models, and to create containers for the implementation of models. Moreover, the rights management of the model can be implemented by the model manager. Since there can be any number of models in the database, various criteria for searching and selecting the suitable model are advantageously provided.

A number of metadata are provided around the models for the various tasks of the model manager. Table 1 summarizes a few exemplary metadata and their purpose.

TABLE 1

| # | Metadata | Purpose |
|---|---|---|
| 1 | Name of the model | Identification by the user |
| 2 | Model ID | Unique identification number |
| 3 | Version number | Management of various model versions |
| 4 | Library for accelerating the computing. | Selection or creation of a suitable container for the implementation of the model |
| 5 | Required software libraries | Selection or creation of a suitable container or a runtime environment for the implementation of the model |
| 6 | Interface for the model | Selection or creation of a suitable container and communication with image recording software |
| 7 | Memory requirements RAM/VRAM | Selection of the suitable hardware for implementing the model (e.g., CPU, GPU, TPU, ASIC, FPGA, embedded computer, workstation, cloud) |

TABLE 1-continued

| # | Metadata | Purpose |
|---|---|---|
| 8 | Position in the workflow | Determination of the suitable hardware or position in the workflow for the user for the implementation of the model |
| 9 | Model category | Selection of the suitable model for the problem |
| 10 | Metric about the capability for each application | Selection of the suitable model for the problem, continuous improvement of the model |
| 11 | Explicit model features | Metadata from the experiment and the image recording for the selection of the suitable model for the problem |
| 12 | Implicit model features | Extracted features or precalculated activations for problem-semantic selection of a suitable model |
| 13 | Author | Rights management |
| 14 | Payment model | Rights management, invoicing, and payment of use |
| 15 | Certification or standard | Rights management in terms of which machine may implement the model |

The models can be implemented in such a way that they can be flexibly integrated into very different environments, such as workstations, embedded computers, FPGAs, TPUs and/or ASICs on an attached microscope component or the cloud without needing to significantly change the environment. The runtime environment can be individually adaptable and versionable for each model because technology develops rapidly in the field of deep learning. Therefore, a container technique is used in embodiments. Using this, it is possible to manage and provide all software libraries, environment variables and "namespaces" together with the model. The model manager identifies which pre-made container can be used on the basis of the metadata or dynamically creates a new suitable container and manages the latter. The library for accelerating the computing, Table 1, Field (4) stores which version of, e.g., CU-DA or OpenCL is required. Further libraries, such as Python version (or version of a different programming language) and Python distribution, Tensorflow, Pytorch and more can be stored in Field (5) of Table 1. The precise dimensionality of the tensors at the input and output of the model and the data type thereof is stored in Field (6) of Table 1. This serves to configure the interface of the container and the data recording software and to select the correct model. In the case of transfer learning, part of a pre-trained model can also be reused in this way in a new application context and can be combined with other model parts. The model can be implemented on different hardware and at different positions in the workflow of the microscope or user, for example in real-time during the recording, asynchronously during the recording for feedback microscopy or during the post-processing. Fields (7) and (8) serve to this end. The memory requirements and the position in the workflow are used to determine the component of the microscope system on which the model can be carried out and/or must be carried out, for example in an FPGA in a point scanner, a camera, a stand or on the CPU or GPU, TPU or ASICs of a workstation or in a computing cluster or in the cloud. Fields (9) to (12) in Table 1 serve to select the suitable model for a given problem. To this end, a model category or the data domain is determined as per Field (9), for example whether this is a model that identifies images or text or whether this solves a classification or regression problem. Metrics about the capability (such as prediction accuracy, "precision", "recall", "F1 score", "dice loss", "SSIM" and others) are captured in Field (10). On the basis thereof, not only is it possible to select the suitable model but available models can also be improved continuously.

The totality of all suitable models in the database of the model manager accordingly behaves like a "supermodel" which learns as a whole to solve specific problems to an ever better and more differentiated extent. As a result of the continuous exchange of models, which are ever further refined on the basis of user data, with different data from users and user groups worldwide, there is a global learning process in relation to all user data of the suitable data domain, which continuously improves the offer of models. This is one of the advantages in relation to simple and isolated applications of neural networks on a single user system.

Explicit model features are stored in Field (11) of Table 1. These are metadata from the experiment, such as staining, cell lines, experimental protocols, biological DNA—or protein sequences, recording speed, temperature, humidity, $CO_2$ content of the buffer, nutrient solution, illumination, detection parameters and much else. A further option for selecting suitable models is the implicit model features in Field (12). These are precalculated activations of the neural network on the basis of exemplary data records or else learned model parameters, which reflect the learned semantic of the model. Semantic relationships between models can be identified without user action by way of suitable unsupervised learning processes, such as "kmeans clustering", "mean shift clustering" or "t-SNE". Consequently, it is also possible to find models that were previously unknown to the user and propose said models to the user. Fields (13) to (15) of Table 1 relate to the rights management of the models. Authors, Field (13), can make models available for free or for a fee. To this end, use can be made of different payment models, stored in Field (14), for example a one-time payment upon download or use-dependent payment in relation to the duration or frequency of use. Field (15) manages what machine may carry out to the relevant model. In certain fields of application, such as medicine, pathology or in the field of in vitro diagnostics, certain standards, acceptance criteria or certifications must be observed. Therefore, the implementation or the download of models in such fields must be strictly regulated. By contrast, devices only serving pure research can implement or download any model.

A search with various search terms, regular expressions and filters can be carried out for all of the aforementioned metadata. Moreover, data mining can be carried out in relation to these metadata in order to manage, select and continuously improve the models.

FIG. 11 schematically shows a model store 1100. The model store 1100 is the marketplace for models and services in the field of "bioimage informatics". Users 1110 of the microscope or web service search for models and request services (such as the creation of models or image processing processes), which are paid using money or a points system. The search is implemented by way of a web front end 1130. Experts 1120 in the field of image processing or microscopy also offer their models and services there. In addition to the creation of models and image processing processes, the service can also contain the provision of their own computing resources. The web front end transacts payment information, user points ("credits") and user levels ("tiers") via a shop back end 1140. To find suitable business partners, the shop back end contains a matchmaking service. The required information in respect of user profiles, credits, tiers, and expose is stored by the shop back end in a user database 1145. Search queries by users are transacted by the model store via the model manager 1160 in step 1150 and it receives suitable models back in step 1155. Conversely, models offered by experts are managed by the model manager 1160. If computing resources 1170 are required to fulfill services, a manufacturer can provide these or can make resources 1170 provided by experts 1120 or third parties available and can provide the desired models or image processing processes there. The user can now download new models to their microscope and implement them there; by way of example, they can download and implement an image processing process or implement the latter on a cloud service provided by the manufacturer or third parties.

Figure 12:
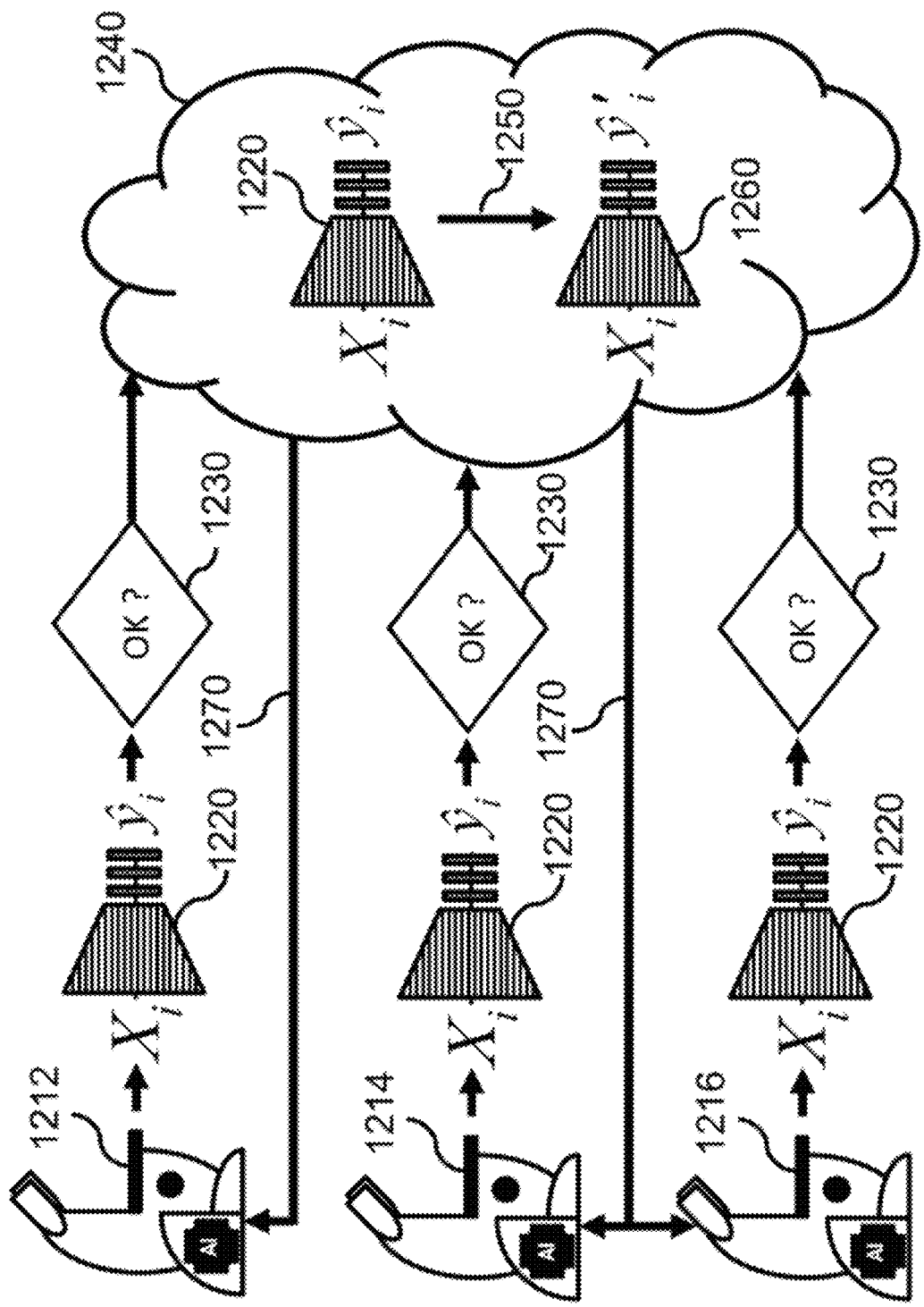
FIG. 12 shows a schematic flowchart of an embodiment of the method according to the invention.

FIG. 12 shows a schematic illustration of an embodiment of the method according to the invention for optimizing a workflow. Measurement systems 1212, 1214 and 1216 each comprise at least one apparatus, on which a trained model 1220 is implemented. The at least one apparatus can comprise a workstation, an embedded computer, a sensor, an actuator and/or a microscope. In addition to the at least one apparatus and one or more microscopes and/or microscope systems, the measurement system itself can comprise further devices which are involved in carrying out a measurement. By way of example, this can comprise devices for laboratory automation, one or more sensors, one or more actuators, one or more specimen preparation devices, one or more microtomes, one or more devices for pipetting liquids and/or an environmental chamber, which are interconnected via a network, e.g., a radio network. Further, the measurement systems 1212, 1214 and 1216 can be spatially separated and can be operated by different users.

The same trained model 1220 can be applied in each measurement system 1212, 1214 and 1216. The trained model 1220 supplies an output $\hat{y}_i$ for an input $X_i$ into the trained model 1220. The trained model can be applied to captured data, which are captured by one or more components, for example a sensor such as a camera, of the one or more microscopes, during a workflow. The captured data can serve as input $X_i$ for the model and comprise image data, metadata, parameter data, data relating to the progress of the experiment, information relating to reagents and materials, information relating to an examined object or an examined specimen, user-related data, and/or device data of devices that are controlled during the course of a measurement carried out by the one or more microscopes and/or microscope systems. At least one decision relating to the workflow of the one or more microscopes or the measurement systems 1212, 1214 and 1216 can be made on the basis of the output $\hat{y}_i$ of the trained model. The at least one decision can comprise an automatic or semiautomatic state change of the one or more microscopes or the components thereof. By way of example, the output $\hat{y}_i$ can be used to control the one or more components or a further trained model can be selected and applied on the basis of the output $\hat{y}_i$. Alternatively, the output $\hat{y}_i$ can also be used to indicate errors or alter parameter data of devices involved in the measurement.

The output $\hat{y}_i$ is assessed in step 1230. The assessment can be based on the capture of an input by a user of the measurement system 1212 and can comprise a negative or positive assessment. In one example, a camera of a microscope of the measurement system 1212 captures an image. The captured image is analyzed by means of the trained model 1220. The pixels of the captured image can correspond to the input value $X_i$ for the trained model 1220. In this example, the trained model 1220 may have been trained to determine the optimal illumination of a specimen and, when applied to the captured image, supplies a prediction or output $\hat{y}_i$ for the intensity of a light source. The intensity of the light source can be set automatically in a further step and a further measurement can be carried out with the new intensity. The assessment by the user of the prediction or output can be implemented actively or passively. By way of example, the user can overwrite the predicted intensity. The system captures the user input and assesses the prediction or output as negative since the assumption is made that the user was not satisfied with the predicted intensity. Accordingly, a lack of user input can be evaluated as a positive assessment. In one exemplary embodiment, an assessment of the prediction can be actively requested by the user. The captured data can be annotated on the basis of the assessment and can be utilized as training data.

Second data are transmitted to the cloud 1240 in a next step. The second data can be uploaded to the cloud 1240 in automatic, semiautomatic, or manual fashion and can comprise at least one of the following: the at least one trained model 1220 or parts thereof, captured data which comprise input data for the at least one trained model, annotations about a target output value of the at least one trained model applied to the input data, hidden representations of data, assessments of output values of the at least one trained model, parameter data of at least one of the one or more components, user inputs, data relating to the progress of an experiment, error messages, information relating to reagents and materials, device data from devices that are controlled during the course of a measurement performed by the one or more microscopes and/or microscope systems, and user-related data. The second data can originate from one or more sources. By way of example, three sources (measurement systems 1212, 1214 and 1216) are shown in FIG. 12. The second data are aggregated in the cloud 1240 in one exemplary embodiment.

In a step 1250, the trained model 1220 is modified or adapted in the cloud 1240 in order to obtain the adapted model 1260. Step 1250 can comprise training at least some of the trained model 1220 at least in part by means of the second data in order to obtain the adapted trained model 1260. Alternatively, it is also possible to train a new model by means of the aggregated data in the cloud 1240. The adapted trained model 1260 supplies an output $\hat{y}'_i$ for an input $X_i$ into the adapted trained model 1260. Therefore, different outputs $\hat{y}_i$ and $\hat{y}'_i$ can be obtained for the same input $X_i$ into the trained model 1220 and the adapted trained model 1260. Consequently, the adapted trained model 1260 can make different predictions for a workflow on the basis of an input $X_i$ than the trained model 1220. In one embodiment, the predictions or outputs $\hat{y}'_i$ of the adapted trained model 1260 are advantageous for a certain or specific application. By way of example, the adaptation can increase a prediction accuracy of the at least one trained model applied to the captured data. A workflow of a microscope or microscope system can be optimized by better predictions or optimized outputs of an adapted trained model.

In a further step 1270, the adapted trained model 1260 or the new trained model can be loaded onto the one or more apparatuses of the measurement systems 1212, 1214 and 1216 and/or be applied. This can occur in an automatic, semiautomatic, or manual fashion. Consequently, trained models can be continuously improved and the workflow of microscopes or microscope systems can be improved.

Figure 13:
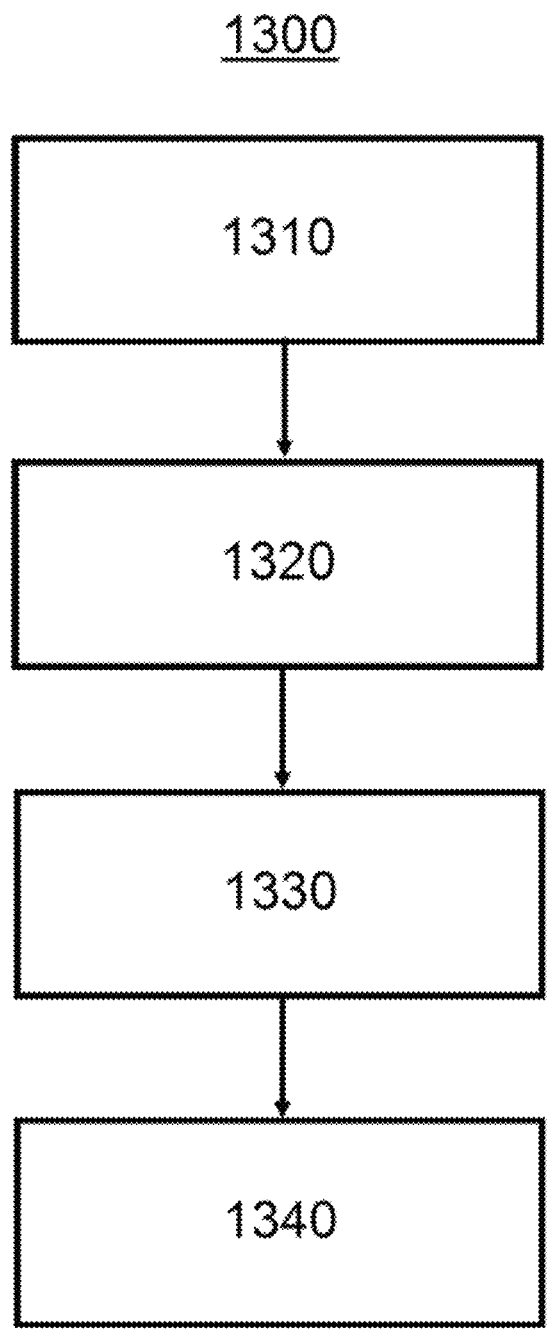
FIG. 13 shows a schematic flowchart of an embodiment of the method according to the invention.

FIG. 13 shows a schematic flowchart according to one exemplary embodiment of a method 1300 according to the invention for optimizing a workflow of at least one microscope or microscope system. The method 1300 comprises a step 1310, in which data are captured during a workflow which is implemented by one or more components of at least one microscope and/or microscope system. The data can be captured by one of the one or more components, e.g., a sensor.

One or more trained models are determined at least in part on the basis of the captured data in a step 1320. The determination of the one or more trained models can comprise an application of a trained master model to the captured data. The one or more trained models can be selected from a multiplicity of trained models, which can be stored locally and can be called from a local database.

In an optional step 1330, the one or more determined trained models are applied to the captured data. This can be carried out while the workflow is implemented. The application of the one or more trained models can comprise an analysis of the data by means of the one or more trained models, on the basis of which at least one decision is made relating to the workflow. The one or more trained models can be applied as a web service, on a workstation, on a microscope or microscope system and/or on attached components of the microscope or microscope system.

In a further step 1340, at least one decision in relation to the workflow is made in accordance with one embodiment on the basis of the application of the one or more trained models. This can comprise a control of at least one of the one or more components.

The one or more trained models or the trained master model can be adapted in one embodiment. To this end, the one or more trained models or the trained master model can be trained on a server, a cloud, or a workstation. The server, the cloud or the workstation are configured in such a way that they can train models by means of deep learning. This can be implemented on the basis of aggregated data from various sources. However, it is also possible for only parts of the one or more trained models or trained master model to be trained. Since this method of training (also referred to as fine-tuning) is less computationally intensive, the adaptation of a part of the one or more trained models or of the trained master model can be performed both on a server, a cloud or a workstation and on microcomputers which are part of a microscope, embedded computers or other apparatuses in a microscope system. Data from different sources can also be used for the fine-tuning.

The selection and use of predictive/trained models, which are used in the measurements of microscopes and make predictions there (inference), optimizes workflows and extends the field of application of microscope measurements. Fields of applications of the inference by these models are multifaceted and comprise, inter alia, the automation of microscopes or experimental processes, either in whole or in part (e.g., finding objects, setting illumination or detection parameters), reconstructions of images and removal of image aberrations (e.g., reducing noise), data mining in data (e.g., segmentation of individual objects, identification of phenotypes), self-diagnoses of microscopes, coordination of servicing operations, quality control and reproducibility of experiments and improvement in the user-friendliness. Fine tuning of the predictive models allows these to be continuously improved and/or the field of application of the models to be specified. Advantageously, this can be implemented by training of only a few nodes in a neural network.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

100 Apparatus
110 One or more processors
120 One or more storage media
130 Trained models
210 Microscope
220 Embedded computer
230 System computer
240, 250 Bidirectional communication links
260 Actuator
270 Sensor
330*a*, 330*b*, 330*c*, 350*b* Microscopes
350*a*, 350*c* Microscope systems
400 Master model
410, 412, 414, 416 Data domains
420, 430, 440 Trained models
500 Microscope/Microscope system
510, 520 Data
530 Trained model
540, 550 Method step
600 Image recording software
610 Container
620 Deep learning bus system
630 Network or cloud storage
700 Container
710 Deep learning container
720 Deep learning bus system
730 Cloud
740 Research institute
750 Workstation of the user
800 Image recording software
810 Deep learning container
820 Deep learning bus system
830 Memory manager
840 Fast local memory
850 Deep learning bus system
860 Workstation
870 Server in the network
910 Web application
911, 912 User
930 Cloud 944 Deep learning bus system
945 Model manager
950 Memory
975 Computing resource with significant computing power
980 System computer
990 Server
1000 Model manager
1010-1015 Method steps
1020 Rights management
1025 Model database
1014 Model store
1030 Container management
1035 Container database
1050 Microscope
1051 Web service
1052 Model store
1053 Computing resource
1100 Model store
1110 User
1130 Web front end
1120 Experts
1140 Shop back end
1145 User database
1150, 1155 Method steps
1160 Model manager
1170 Computing resource
1212-1216 Measurement systems
1220 Trained model
1230 Assessment
1240 Cloud
1250 Method step
1260 Adapted trained model
1270 Method step
1300 Method
1310-1340 Method steps

The invention claimed is:

1. A method for optimizing a workflow of at least one microscope or microscope system, the method comprising:
implementing the workflow by one or more components of the at least one microscope and/or microscope system during an experiment, the one or more components comprising at least one of an actuator, a sensor for capturing images of a sample being investigated in the experiment, or a light source for illuminating the sample while the images of the sample are captured, wherein the workflow comprises a capture of first data using the one or more components, the first data comprising image data;
determining a trained model for the workflow, at least in part based on the first data, wherein an output of the trained model for the workflow comprises setting one or more parameters of the one or more components of the at least one microscope and/or microscope system, the one or more parameters comprise at least one of an exposure time of the sensor or an intensity of the light source;
assessing the one or more parameters;
generating annotated data based on the assessing the one or more parameters;
adapting the trained model to obtain an adapted trained model by training a part of the trained model based at least in part on the annotated data so that a prediction accuracy of the adapted trained model is increased in comparison with a prediction accuracy of the trained model; and
applying the adapted trained model to the workflow, by implementing the one or more parameters to the one or more components of the at least one microscope and/or microscope system, for capturing further data of the sample during the experiment, wherein a trained master model is trained using data of a first class, and the captured first data are data of a second class, which differs from the first class, wherein the annotated data are of the second class, and wherein the assessing the one or more parameters is based on whether a user overwrites the one or more parameters.

2. The method according to claim 1, wherein the determining the trained model comprises an analysis of the first data by the trained master model.

3. The method according to claim 2, wherein the trained master model is applied as a web service, on a workstation, on the at least one microscope or microscope system or on an attached component of the at least one microscope or microscope system.

4. The method according to claim 1, wherein the determining the trained model comprises selecting, from a multiplicity of trained models, a model that has been trained in a certain way.

5. The method according to claim 4, wherein:
the multiplicity of trained models are classified by field of use, and/or
the multiplicity of trained models are organized hierarchically, and/or
individual trained models from the multiplicity of trained models are specialized for individual types of specimens, experiments, measurements, recording modalities or device settings.

6. The method according to claim 1, further comprising automatically applying the determined trained model.

7. The method according to claim 6, wherein the determined trained model is automatically applied to the captured first data and/or new captured data.

8. The method according to claim 6, wherein at least one decision relating to the workflow is made based on the application of the trained model.

9. The method according to claim 1, wherein the adapting the trained model comprises:
training the trained model using aggregated data, wherein the aggregated data originate from one or more sources, and wherein the aggregated data comprise data uploaded to a cloud, a server or a workstation in automatic, semiautomatic or manual fashion.

10. The method according to claim 1, wherein the trained model was trained by deep learning on a cloud, a server or a workstation using data from one or more sources and was loaded onto the at least one microscope or microscope system and/or onto an attached component of the at least one microscope or microscope system.

11. An apparatus for optimizing workflows of one or more microscopes and/or microscope systems, the apparatus comprising:
one or more processors; and
one or more computer-readable storage media on which computer-executable instructions are stored, the instructions, when executed by the one or more processors, cause execution of:
implementing a workflow by one or more components of one or more microscopes and/or microscope systems during an experiment, the one or more components comprising at least one of an actuator, a sensor for capturing images of a sample being investigated in the experiment, or a light source for illuminating the sample while the images of the sample are captured, wherein the workflow comprises a capture of first data using the one or more components, the first data comprising image data;

determining one or more trained models for the workflow, at least in part based on the first data, wherein an output of the one or more trained models for the workflow comprises setting one or more parameters of the one or more components of the one or more microscopes and/or microscope systems, the one or more parameters comprise at least one of an exposure time of the sensor or an intensity of the light source;

assessing the one or more parameters;

generating annotated data based on the assessing the one or more parameters;

adapting the one or more trained models to obtain adapted trained models by training a part of the one or more trained models based at least in part on the annotated data so that a prediction accuracy of the adapted trained models is increased in comparison with a prediction accuracy of the one or more trained models; and applying the adapted trained models to the workflow, by implementing the one or more parameters to the one or more components of the one or more microscopes and/or microscope systems, for capturing further data of the sample during the experiment, wherein a trained master model is trained using data of a first class, and the captured first data are data of a second class, which differs from the first class, wherein the annotated data are of the second class, and wherein the assessing the one or more parameters is based on whether a user overwrites the one or more parameters.

12. The apparatus according to claim 11, wherein the workflow comprises an application of the trained master model to the captured first data, and wherein the determination of the one or more trained models for the workflow is at least partly implemented based on the application of the trained master model to the captured first data.

13. The apparatus according to claim 12, wherein the application of the trained master model comprises an analysis of the captured first data, and wherein the trained master model determines the one or more trained models for the workflow based on information from the analysis of the captured first data.

14. The apparatus according to claim 11, wherein the computer-executable instructions, when executed by the one or more processors, further causes execution of:
applying at least one of the determined one or more trained models to the captured first data, wherein:
at least one decision relating to the workflow is made based on the application of the at least one of the determined one or more trained models, and/or
the at least one of the determined one or more trained models is automatically applied during the measurement.

15. The apparatus according to claim 11, wherein the captured first data further comprise at least one of: user inputs; error messages; metadata; the parameters of the one or more components; data relating to a progress of the experiment; information relating to reagents and materials; information relating to an object or a specimen; user-related data; or device data of devices that are controlled during the experiment by the one or more microscopes and/or microscope systems and/or by attached components of the one or more microscopes and/or microscope systems.

16. The apparatus according to claim 11, wherein the one or more processors comprise one or more of graphical processing units (GPUs), TensorFlow processing units (TPUs), application-specific integrated circuits (ASICs), field-programmable gate arrays (FPGAs), or a central processing unit (CPU).

17. A system for adapting a workflow, the system comprising:
an apparatus comprising:
one or more processors; and
one or more computer-readable storage media on which computer-executable instructions are stored, the instructions, when executed by the one or more processors, cause execution of:
implementing a workflow by one or more components of one or more microscopes and/or microscope systems during an experiment, the one or more components comprising at least one of an actuator, a sensor for capturing images of a sample being investigated in the experiment, or a light source for illuminating the sample while the images of the sample are captured, wherein the workflow comprises a capture of first data using the one or more components, the first data comprising image data;
determining one or more trained models for the workflow, at least in part based on the first data, wherein an output of the one or more trained models for the workflow comprises setting one or more parameters of the one or more components of the one or more microscopes and/or microscope systems, the one or more parameters comprise at least one of an exposure time of the sensor or an intensity of the light source;
assessing the one or more parameters;
generating annotated data based on the assessing the one or more parameters;
adapting at least one trained model of the one or more trained models to obtain an adapted trained model by training a part of the one or more trained models based at least in part on the annotated data so that a prediction accuracy of the adapted trained model is increased in comparison with a prediction accuracy of the at least one trained model; and
applying the adapted trained models to the workflow, by implementing the one or more parameters to the one or more components of the one or more microscopes and/or microscope systems, for capturing further data of the sample during the experiment, wherein a trained master model is trained using data of a first class, and the captured first data are data of a second class, which differs from the first class, wherein the annotated data are of the second class, and wherein the assessing the one or more parameters is based on whether a user overwrites the one or more parameters.

18. The system according to claim 17, wherein:
second data further comprise at least one of annotations of the input data or user inputs.

19. The system according to claim 17, further comprising a model store as a software component on the at least one apparatus, wherein the model store is set up to select trained models, and/or the system is configured to download the trained models using an interface and the model store for purposes of local execution.

20. The system according to claim 17, wherein a model manager is configured to implement the one or more trained models on the at least one apparatus based on an event, and wherein the event comprises at least one of the following:
    receiving a request from a user via a web service;
    receiving a request based on a result of an analysis of the first data by one of the one or more trained models;
    receiving a request based on a step in the workflow;
    receiving one or more results by data mining on model metadata, hidden representations or model parameters;
    receiving a request from a model store; or
    receiving a request based on a capture of explicit model parameters which include experimental conditions.

21. The system according to claim 17, wherein a model manager is configured to:
    regulate rights management using a model database, wherein the model database stores at least one of the following information items: a model architecture, model parameters, model metadata, or model rights;
    control communication between individual ones or groups of the at least one apparatus;
    manage versions of trained models;
    assign one of the trained models to a field of application;
    output one of the trained models within a container to the at least one apparatus, wherein the model manager comprises a container manager configured to create or provide containers for executing the trained models; and/or
    manage metadata of the trained models, wherein the metadata are used to manage the trained models and/or wherein the metadata comprise at least one of the following: a unique identification of the trained model, a version number of the trained model, an identification of a use location in a device, a category of the trained model, or an object of the trained model.

* * * * *